United States Patent
Agiwal et al.

(10) Patent No.: US 12,184,383 B2
(45) Date of Patent: Dec. 31, 2024

(54) METHOD AND APPARATUS FOR TRANSMITTING AND RECEIVING BEAM FAILURE RECOVERY REQUEST FOR SECONDARY CELL

(71) Applicant: Samsung Electronics Co., Ltd., Suwon-si (KR)

(72) Inventors: Anil Agiwal, Suwon-si (KR); Soenghun Kim, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/499,975

(22) Filed: Nov. 1, 2023

(65) Prior Publication Data

US 2024/0063882 A1 Feb. 22, 2024

Related U.S. Application Data

(63) Continuation of application No. 16/925,223, filed on Jul. 9, 2020, now abandoned.

(Continued)

(51) Int. Cl.
*H04B 7/06* (2006.01)
*H04B 17/318* (2015.01)
(Continued)

(52) U.S. Cl.
CPC ......... *H04B 7/0695* (2013.01); *H04B 17/318* (2015.01); *H04W 28/0278* (2013.01);
(Continued)

(58) Field of Classification Search
CPC ...... H04B 7/063; H04B 7/0695; H04B 7/088; H04B 17/318; H04W 28/0278; H04W 56/001; H04W 72/14; H04W 76/19
(Continued)

(56) References Cited

U.S. PATENT DOCUMENTS 10,542,545 B2  1/2020  Yu et al.
10,659,123 B2  5/2020  Lee et al.
(Continued)

FOREIGN PATENT DOCUMENTS

CN  107211015 A  9/2017
CN  107637121 A  1/2018
(Continued)

OTHER PUBLICATIONS

Examination Report dated Apr. 26, 2024, in connection with Indian Patent Application No. 202137047164, 7 pages.
(Continued)

*Primary Examiner* — Harun Chowdhury

(57) ABSTRACT

A communication method and system for converging a $5^{th}$ generation (5G) communication system for supporting higher data rates beyond a $4^{th}$ generation (4G) system with a technology for Internet of things (IoT) are provided. The communication method and system may be applied to intelligent services based on the 5G communication technology and the IoT-related technology. A method performed by a terminal for beam failure recovery (BFR) on a secondary cell (SCell) in a wireless communication system comprises receiving information for BFR on an SCell including a scheduling request configuration for the BFR on the SCell; detecting beam failure on the SCell based on whether a number of beam failure instances within a preconfigured time duration exceeds a preconfigured number; and, as a response to detecting the beam failure on the SCell, transmitting a scheduling request for the BFR on the SCell based on the scheduling request configuration.

14 Claims, 27 Drawing Sheets

Related U.S. Application Data

(60) Provisional application No. 62/872,132, filed on Jul. 9, 2019.

(51) Int. Cl.
| | |
|---|---|
| *H04W 28/02* | (2009.01) |
| *H04W 52/36* | (2009.01) |
| *H04W 56/00* | (2009.01) |
| *H04W 72/23* | (2023.01) |
| *H04W 76/19* | (2018.01) |
| *H04W 80/02* | (2009.01) |

(52) U.S. Cl.
CPC ....... *H04W 52/365* (2013.01); *H04W 56/001* (2013.01); *H04W 72/23* (2023.01); *H04W 76/19* (2018.02); *H04W 80/02* (2013.01)

(58) Field of Classification Search
USPC .......................................... 370/252, 329, 331
See application file for complete search history.

(56) References Cited

U.S. PATENT DOCUMENTS

| | | | |
|---|---|---|---|
| 11,109,254 B2 | 8/2021 | Kim et al. | |
| 11,456,945 B2 | 9/2022 | Luo et al. | |
| 2018/0092118 A1 | 3/2018 | Kim et al. | |
| 2018/0302889 A1 | 10/2018 | Guo et al. | |
| 2019/0052339 A1 | 2/2019 | Zhou et al. | |
| 2019/0058517 A1 | 2/2019 | Kang et al. | |
| 2020/0137821 A1* | 4/2020 | Cirik | H04B 7/063 |
| 2020/0145280 A1* | 5/2020 | Cirik | H04B 7/0695 |
| 2020/0314722 A1 | 10/2020 | Kyung et al. | |
| 2022/0015130 A1* | 1/2022 | Wang | H04W 72/02 |

FOREIGN PATENT DOCUMENTS

| | | |
|---|---|---|
| CN | 108702767 A | 10/2018 |
| CN | 109644415 A | 4/2019 |
| CN | 109891774 A | 6/2019 |
| WO | 2019017751 A1 | 1/2019 |
| WO | 2019032882 A1 | 2/2019 |

OTHER PUBLICATIONS

Office Action dated Oct. 25, 2023, in connection with Chinese Patent Application No. 202080043785.4, 12 pages.
European Patent Office, "Supplementary European Search Report" issued Feb. 22, 2022, in connection with European Patent Application No. 20837522.0, 9 pages.
Qualcomm Incorporated: "Enhancements on Multi-beam Operation", R1-1905027, 3GPP TSG-RAN WG1 Meeting #96-Bis, Xian, China, Apr. 8-12, 2019, 26 pages.
Communication pursuant to Article 94(3) EPC dated Jun. 22, 2023, in connection with European Patent Application No. 20837522.0, 6 pages.
Huawei, HiSilicon, "Beam failure recovery for SCell with new beam information", 3GPP TSG RAN WG1 Meeting #97, May 13-17, 2019, R1-1907533, 7 pages.
Intel Corporation, "Summary on L1-SINR and SCell BFR", 3GPP TSG RAN WG1 Meeting #97, May 13-17, 2019, R1-1907674, 22 pages.
Convida Wireless, "On Beam Failure Recovery for SCell", 3GPP TSG-RAN WG1 #97, May 13-17, 2019, R1-1907466, 6 pages.
Ericsson, "Latency analysis of SCell BFR solutions", 3GPP TSG-RAN WG1 Meeting #97, May 13-17, 2019, Tdoc R1-1907438, 4 pages.
International Search Report dated Oct. 13, 2020 in connection with International Patent Application No. PCT/KR2020/009055, 3 pages.
Notice of Allowance issued Jul. 25, 2024, in connection with Chinese Patent Application No. 202080043785.4, 9 pages.

* cited by examiner

FIG. 1
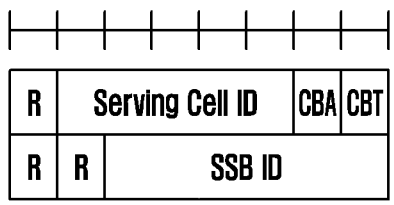
BFR Request MAC CE Format for
reporting SSB based candidate beam
(CBA:1; CBT:0)
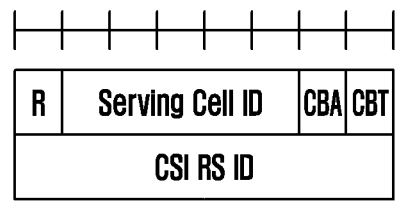
BFR Request MAC CE Format for
reporting CSI RS based candidate beam
(CBA:1, CBT:1)
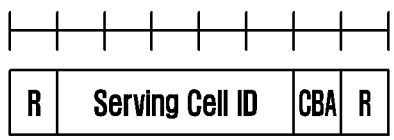
BFR Request MAC CE Format when
no candidate beam is available
(CBA:0)
CBA: Candidate Beam Available
CBT: Candidate Beam Type: SSB or CSI RS FIG. 6
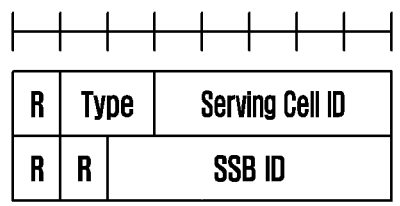
BFR Request MAC CE Format for
reporting SSB based candidate beam
(Type = 0)
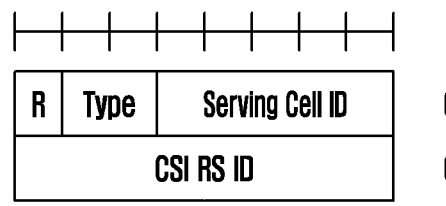
BFR Request MAC CE Format for
reporting CSI RS based candidate beam
(Type = 1)
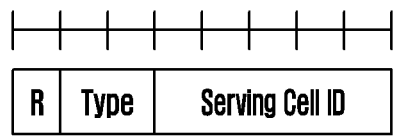
BFR Request MAC CE Format when
no candidate beam is available
(Type = 2)

FIG. 10
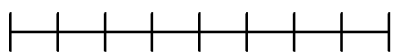
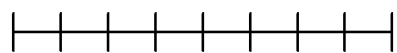
BFR Request MAC CE Format for
reporting SSB based candidate beam
(CBA:1/0; CBT:0)
BFR Request MAC CE Format for
reporting CSI RS based candidate beam
(CBA:1/0, CBT:1)
NOTE: CBA equals zero indicates that there
is no candidate beam above threshold.
Reported candidate beam is the best beam.
CBA: Candidate Beam Available
CBT: Candidate Beam Type: SSB or CSI RS

FIG. 13

| R | R | Serving Cell ID | CBA | Oct 1
| R | R | SSB ID | | Oct 2

BFR Request MAC CE Format for
reporting SSB based candidate beam
(CBA:1)

| R | R | Serving Cell ID | CBT | Oct 1
| R | R | CSI RS ID | | Oct 2

BFR Request MAC CE Format for
reporting CSI RS based candidate beam
(CBA:1)

| R | R | Serving Cell ID | CBA | Oct 1

BFR Request MAC CE Format when
no candidate beam is available
(CBA:0)

NOTE: Candidate beam list indicates either SSB or CSI RS beams. All beams are of same type. So gNB can know beam type implicitly.

FIG. 16
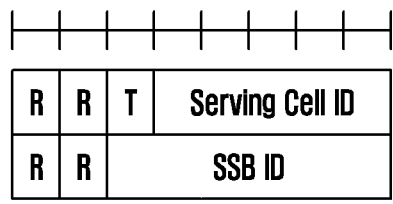
BFR Request MAC CE Format for reporting SSB based candidate beam (T : 1)
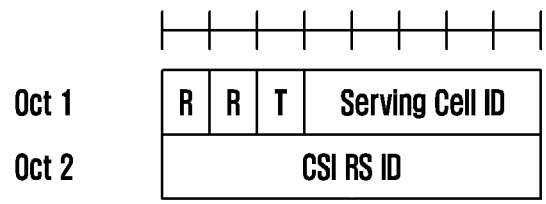
BFR Request MAC CE Format for reporting CSI RS based candidate beam (T:1)
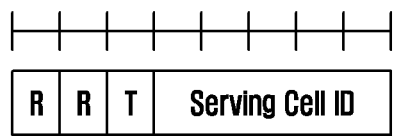
BFR Request MAC CE Format when no candidate beam is available (T:0)
NOTE: Candidate beam list indicates either SSB or CSI RS beams. All beams are of same type. So gNB can know beam type implicitly.

FIG. 17
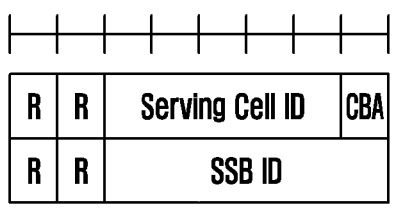
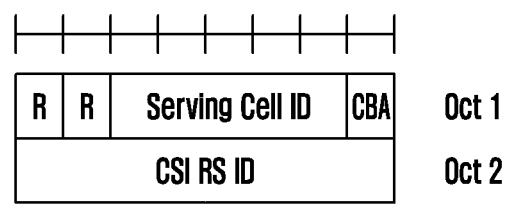
BFR Request MAC CE Format for reporting SSB based candidate beam (CBA:1/0)
BFR Request MAC CE Format for reporting CSI RS based candidate beam (CBA:1/0)
NOTE: Candidate beam list indicates either SSB or CSI RS beams. All beams are of same type. So gNB can know beam type implicitly.
CBA: Candidate Beam Available FIG. 21
Beam Info Option 1
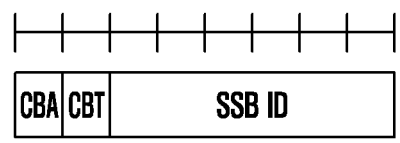
SSB based Beam Info (CBA = 1, CBT = 0)
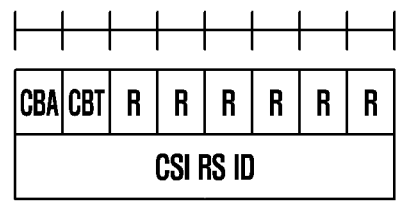
CSI RS based Beam Info (CBA = 1, CBT = 1)
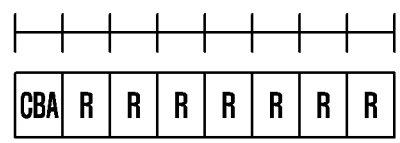
CSI RS based Beam Info (CBA = 0)

FIG. 22
Beam Info Option 1A
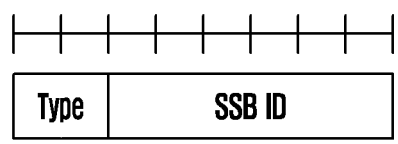
SSB based Beam Info ( Type = 0)
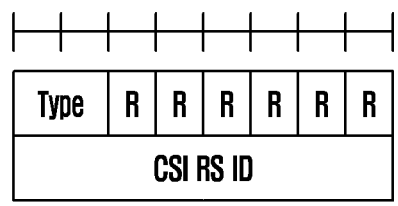
CSI RS based Beam Info (Type = 1)
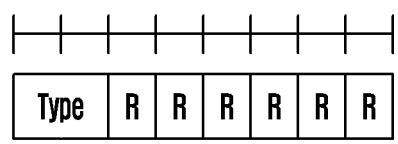
CSI RS based Beam Info (Type = 2)

FIG. 23
Beam Info Option 1B
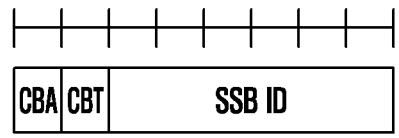
SSB based Beam Info (CBA = 1/0, CBT = 0)
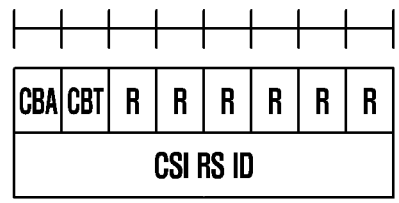
CSI RS based Beam Info (CBA = 1/0, CBT = 1)
NOTE: CBA equals zero indicates that there is no candidate beam above threshold. Reported candidate beam is the best beam.

FIG. 24
Beam Info Option 2
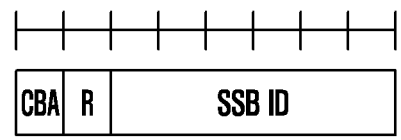
SSB based Beam Info ( CBA = 1)
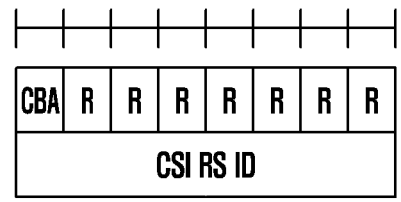
CSI RS based Beam Info (CBA = 1)
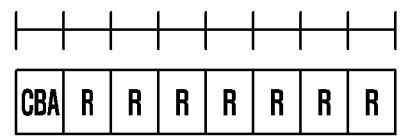
CSI RS based Beam Info (CBA = 0)
NOTE: Candidate beam list indicates either SSB or CSI RS beams. All beams are of same type. So gNB can know beam type implicitly.

FIG. 25
Beam Info Option 2A
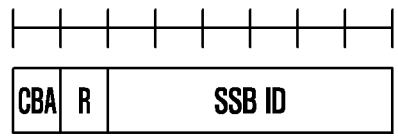
SSB based Beam Info ( CBA = 1/0)
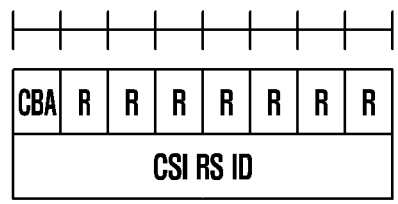
CSI RS based Beam Info (CBA = 1/0)
NOTE: Candidate beam list indicates either SSB or CSI RS beams. All beams are of same type. So gNB can know beam type implicitly.
NOTE: CBA equals zero indicates that there is no candidate beam above threshold. Reported candidate beam is the best beam.

METHOD AND APPARATUS FOR TRANSMITTING AND RECEIVING BEAM FAILURE RECOVERY REQUEST FOR SECONDARY CELL

CROSS-REFERENCE TO RELATED APPLICATIONS

This application is a continuation of application Ser. No. 16/925,223 filed Jul. 7, 2020, which is based on and claims priority under 35 U.S.C. § 119(e) to U.S. Provisional Application No. 62/872,132 filed on Jul. 9, 2019 in the U.S. Patent and Trademark Office, the disclosures of which are incorporated by reference herein in their entirety.

BACKGROUND

1. Field

The disclosure relates to a method of transmitting and receiving frame information in random access response (RAR), a method of handling configured grant transmission in unlicensed carrier, and a method of random access (RA) procedure for supporting large RAR window size.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also referred to as a 'beyond 4G network' or a 'post long term evolution (LTE) System.' The 5G wireless communication system is considered to support not only lower frequency bands but also higher frequency (mmWave) bands, e.g., 10 GHz to 100 GHz bands, so as to accomplish higher data rates. To mitigate propagation loss of the radio waves and increase the transmission distance, beamforming, massive multiple-input multiple-output (MIMO), full dimensional MIMO (FD-MIMO), array antenna, analog beam forming, and large-scale antenna techniques are being considered in the design of the 5G wireless communication system. In addition, in 5G communication systems, development for system network improvement is under-way based on advanced small cells, cloud radio access networks (RANs), ultra-dense networks, device-to-device (D2D) communication, wireless backhaul, moving network, cooperative communication, coordinated multi-points (CoMP), reception-end interference cancellation, and the like. In the 5G system, frequency and quadrature amplitude modulation (FQAM), which is a combination of hybrid frequency shift keying (FSK) and quadrature amplitude modulation (QAM), and sliding window superposition coding (SWSC) as an advanced coding modulation (ACM), filter bank multi-carrier (FBMC), non-orthogonal multiple access (NOMA), and sparse code multiple access (SCMA) as an advanced access technology, have been also developed.

In a similar regard, the Internet, which is a human centered connectivity network where humans generate and consume information, is now evolving to the internet of things (IoT) where distributed entities, such as things, exchange and process information without human intervention. The internet of everything (IoE), which is a combination of IoT technology and big data processing technology through connection with a cloud server, has also emerged. As technology elements, such as "sensing technology," "wired/wireless communication and network infrastructure," "service interface technology," and "security technology" have been demanded for IoT implementation, a sensor network, a machine-to-machine (M2M) communication, machine-type communication (MTC), and so forth have been recently researched. Such an IoT environment may provide intelligent Internet technology services that create a new value to human life by collecting and analyzing data generated among connected things. In this case, IoT may be applied to a variety of fields including a smart home, a smart building, a smart city, a smart car or connected cars, a smart grid, health care, smart appliances, and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

In recent years, several broadband wireless technologies have been developed to meet the growing number of broadband subscribers and to provide more and better applications and services such as these. The second generation (2G) wireless communication system has been developed to provide voice services while ensuring the mobility of users. Third generation (3G) wireless communication system supports the voice service and data service. The 4G wireless communication system has been developed to provide high-speed data service. However, the 4G wireless communication system currently suffers from lack of resources to meet the growing demand for high speed data services. Therefore, the 5G wireless communication system (also referred as next generation radio or NR) is being developed to meet the growing demand of various services with diverse requirements, e.g., high-speed data services, support ultra-reliability and low-latency applications.

In addition, the 5G wireless communication system is expected to address different use cases having quite different requirements in terms of data rate, latency, reliability, mobility etc. However, it is expected that the design of the air-interface of the 5G wireless communication system will be flexible enough to serve user equipment (UEs) having quite different capabilities depending on the use case and market segment in which the UE caters service to the end customer. Example use cases the 5G wireless communication system is expected to address includes enhanced mobile broadband (eMBB), massive machine type communication (m-MTC), ultra-reliable low-latency communication (URLL), etc. The eMBB requirements (e.g., tens of Gbps data rate, low-latency, high-mobility and so on) address the market segment representing the wireless broadband subscribers needing internet connectivity everywhere, all the time and on the go. The m-MTC requirements (e.g., very high connection density, infrequent data transmission, very long battery life, low mobility address and so on) address the market segment representing the IoT/IoE envisioning connectivity of billions of devices. The URLL requirements (e.g., very low latency, very high reliability variable mobility and so on) address the market segment representing the Industrial automation application and vehicle-to-vehicle/vehicle-to-infrastructure communication that is foreseen as one of the enablers for autonomous cars.

In the 5G wireless communication system operating in higher frequency (mmWave) bands, UE and gNB communicate with each other using Beamforming. Beamforming techniques are used to mitigate the propagation path losses and to increase the propagation distance for communication at higher frequency band. Beamforming enhances the transmission and reception performance using a high-gain antenna. Beamforming can be classified into Transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make plurality of transmit (TX) beam patterns of different directions. Each of these TX beam patterns can be also referred as TX beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming. A receiver can also make plurality of receive (RX) beam patterns of different directions. Each of these RX beam patterns can be also referred as RX beam.

Typically, in a wireless communication network, UE can be in one of radio resource control (RRC) idle state or RRC connected state. A UE in RRC idle performs cell selection and reselection. In other words, a UE in RRC idle decides on which cell to camp. The RRC idle UE monitors a paging channel to detect incoming calls, and also acquires system information. The system information mainly consists of parameter by which network can control the cell (re)selection process. In RRC connected state, network allocates radio resources to the UE to facilitate the transfer of (unicast) data via shared data channels. To support this operation, the UE monitors an associated control channel used to indicate the dynamic allocation of the shared transmission resources in time and frequency. The UE provides the network with reports of its buffer status and of the downlink channel quality, as well as neighbor cell measurement information to enable network to select the most appropriate cell for the UE. In the RRC connected state, UE monitors the downlink (DL) subframes or transmission time interval (TTI) or slot for downlink control information (downlink control information can be transmitted using (enhanced) physical downlink control channel ((e)PDCCH)). Downlink control information can indicate whether the UE is scheduled in DL or uplink (UL). If the UE is scheduled in DL, then UE decodes and receives the downlink packet using the received control information. If the UE is scheduled in UL, then UE uses the received control information to transmit the uplink packet. In a beamformed system, the downlink control information is transmitted by the base station (BS) using beamforming. BS supports multiple TX beams and transmits using one or more TX beams in subframe, TTI or time slot. UE monitors the subframes, TTIs or time slots for receiving downlink control information (i.e., PDCCH/ ePDCCH). The one or more TX beams used by the BS to communicate with a UE are decided based on a beam management procedure which basically comprises of UE measuring the reference signals transmitted using multiple TX beams and reporting one or more suitable TX beams to the BS.

The 5G wireless communication system supports standalone mode of operation as well dual connectivity (DC). In DC, a multiple RX/TX UE may be configured to utilize resources provided by two different nodes (or node Bs (NBs)) connected via non-ideal backhaul. One node acts as the master node (MN) and the other as the secondary node (SN). The MN and SN are connected via a network interface and at least the MN is connected to the core network. NR also supports multi-radio access technology (RAT) DC (MR-DC) operation whereby a UE in RRC_CONNECTED is configured to utilize radio resources provided by two distinct schedulers, located in two different nodes connected via a non-ideal backhaul and providing either E-UTRA (i.e. if the node is an ng-eNB) or NR access (i.e. if the node is a gNB).

In NR, for a UE in RRC_CONNECTED not configured with carrier aggregation (CA)/DC, there is only one serving cell comprising of the primary cell (PCell). For a UE in RRC_CONNECTED configured with CA/DC, the term 'serving cells' is used to denote the set of cells comprising of the special cell(s) (SpCell(s)) and all secondary cells (SCells).

In NR, the term master cell group (MCG) refers to a group of serving cells associated with the MN, comprising of the PCell and optionally one or more SCells. In NR, the term secondary cell group (SCG) refers to a group of serving cells associated with the SN, comprising of the primary SCG cell (PSCell) and optionally one or more SCells. In NR, PCell refers to a serving cell in MCG, operating on the primary frequency, in which the UE either performs the initial connection establishment procedure or initiates the connection re-establishment procedure. In NR, for a UE configured with CA, SCell is a cell providing additional radio resources on top of SpCell. PSCell refers to a serving cell in SCG in which the UE performs random access when performing the reconfiguration with synchronization procedure. For DC, operation the term SpCell refers to the PCell of the MCG or the PSCell of the SCG, otherwise (e.g., when DC is not configured) the term SpCell refers to the PCell.

The 5G wireless communication system supports a beam failure recovery (BFR) mechanism at UE for PCell or PSCell. This comprises of beam failure detection, new candidate beam identification, BFR request transmission and monitoring response for BFR request. UE monitors synchronization signals (SSs) or channel state information reference signals (CSI-RSs) transmitted periodically by the serving cell (PCell or PSCell) to assess if a beam failure trigger condition has been met and also to identify a new candidate beam. A beam failure is detected on a serving cell if number of consecutive detected beam failure instance exceeds a configured maximum number within a time interval given by beamFailureDetectionTimer. A beam failure instance means that all serving beams in a set of beams configured for beam failure detection fails (i.e., hypothetical PDCCH block error rate (BLER) determined based on measurement of SS or CSI-RS is above a threshold). The set of beams for beam failure detection for a serving cell are configured via RRC message. A new candidate beam is the CSI-RS or SS block (SSB) of serving cell whose measured quality (e.g., reference signal received power (RSRP)) is above a configured threshold.

After detecting beam failure on SpCell, UE initiates random access procedure on SpCell for beam recovery. UE also starts the starts beamFailureRecoveryTimer, if configured. 1) UE selects contention free (dedicatedly signaled to UE) physical random access channel (PRACH) occasion and/or preamble corresponding to SpCell's new candidate beam and transmits the preamble. 2) UE then starts the bfr-Response Window at the start of the first PDCCH occasion after a fixed duration of X symbols from the end of the preamble transmission. bfr-ResponseWindow is the RAR response window configured by gNB for BFR. 3) UE monitors the PDCCH of the SpCell for response to BFR request identified by the cell radio network temporary identifier (C-RNTI) while bfr-ResponseWindow is running. 4) If UE receives a PDCCH transmission addressed to the C-RNTI from the SpCell, UE considers the BFR request procedure successfully completed and beamFailureRecoveryTimer is stopped. If the bfr-Response Window is expired, UE performs 1), 2) and 3) again. If the bfr-Response Window is expired and UE has already transmitted PRACH preamble for configured number of times, BFR request procedure is considered unsuccessful and UE may trigger radio link failure. If beamFailureRecoveryTimer is expired and BFR request procedure is not successfully completed, UE stops using the contention free random access resources configured for BFR.

UE may be configured with secondary serving cell(s) in addition to SpCell. In case of beam failure detection on SCell, the BFR procedure of initiating random access procedure on SpCell does not work. The reason is that PRACH occasions and/or preambles for preamble transmission on SpCell are mapped to SS or CSI-RS transmitted on SpCell, and hence cannot indicate candidate beam of SCell. Additionally, reception of PDCCH addressed to C-RNTI on SpCell cannot represent response for BFR for SCell as this may be transmitted for DL/UL assignment for SpCell. So, a new method of BFR on SCell is being studied in 3rd generation partnership project (3GPP). For BFR request upon detection of BFR on SCell, a media access control (MAC) media access control (CE) including candidate beam can be transmitted to network. If MAC CE is used for BFR request, several issues need to be solved such as the format of MAC CE, contents of MAC CE, prioritization of MAC CE compared to other information to be transmitted in UL MAC protocol data unit (PDU), on which serving cell MAC CE is transmitted and so on. In this disclosure, a method of transmitting and receiving BFR request MAC CE for SCell is proposed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication method and system for converging a $5^{th}$ generation (5G) communication system for supporting higher data rates beyond a $4^{th}$ generation (4G) system.

Additional aspects will be set forth in part in the description which follows and, in part, will be apparent from the description, or may be learned by practice of the presented embodiments.

In accordance with an aspect of the disclosure, a method performed by a terminal for beam failure recovery (BFR) on a secondary cell (SCell) in a wireless communication system is provided. The method comprises receiving, from the base station, information for BFR on an SCell including a scheduling request configuration for the BFR on the SCell; detecting beam failure on the SCell based on whether a number of beam failure instances within a preconfigured time duration exceeds a preconfigured maximum number; and as a response to detect the beam failure on the SCell, transmitting, to the base station, a scheduling request for the BFR on the SCell based on the scheduling request configuration.

In accordance with another aspect of the disclosure, a method performed by a base station for BFR on an SCell in a wireless communication system is provided. The method comprises transmitting, to a terminal, information for BFR on an SCell including a scheduling request configuration for the BFR on the SCell, and receiving, from the terminal, a scheduling request for the BFR on the SCell based on the scheduling request configuration.

In accordance with another aspect of the disclosure, a terminal in a wireless communication system is provided. The terminal includes a transceiver and at least one processor operatively coupled with the transceiver. The at least one processor is configured to receive, from a base station via the transceiver, information for BFR on an SCell including a scheduling request configuration for the BFR on the SCell, detect beam failure on the SCell based on whether a number of beam failure instances within a preconfigured time duration exceeds a preconfigured number, and as a response to detecting the beam failure on the SCell, transmit, to the base station via the transceiver, a scheduling request for the BFR on the SCell based on the scheduling request configuration.

In accordance with another aspect of the disclosure, a base station in a wireless communication system is provided. The base station includes a transceiver and at least one processor operatively coupled with the transceiver. The at least one processor is configured to transmit, to a terminal via the transceiver, information for BFR on an SCell including a scheduling request configuration for the BFR on the SCell, and receive, from the terminal via the transceiver, a scheduling request for the BFR on the SCell based on the scheduling request configuration.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1 shows the various media access control (MAC) control element (CE) formats based on information to be included in beam failure recovery (BFR) MAC CE according to an embodiment based on the first method of the disclosure;

FIG. 6 shows the various MAC CE formats based on information to be included in BFR MAC CE according to another embodiment based on the first method of the disclosure;

FIG. 10 shows the various MAC CE formats based on information to be included in BFR MAC CE according to an embodiment based on the second method of the disclosure;

FIG. 13 shows the various MAC CE formats based on information to be included in BFR MAC CE according to an embodiment based on the third method of the disclosure;

FIG. 16 shows the various MAC CE formats based on information to be included in BFR MAC CE according to another embodiment based on the third method of the disclosure;

FIG. 17 shows the various MAC CE formats based on information to be included in BFR MAC CE according to an embodiment based on the fourth method of the disclosure;

FIG. 21 shows format and various fields of beam information according to one embodiment based on the fifth method of the disclosure;

FIG. 22 shows format and various fields of beam information according to another embodiment based on the fifth method of the disclosure;

FIG. 23 shows format and various fields of beam information according to another embodiment based on the fifth method of the disclosure;

FIG. 24 shows format and various fields of beam information according to another embodiment based on the fifth method of the disclosure;

FIG. 25 shows format and various fields of beam information according to another embodiment based on the fifth method of the disclosure;

Throughout the drawings, like reference numerals will be understood to refer to like parts, components, and structures.

DETAILED DESCRIPTION

Figure 2:
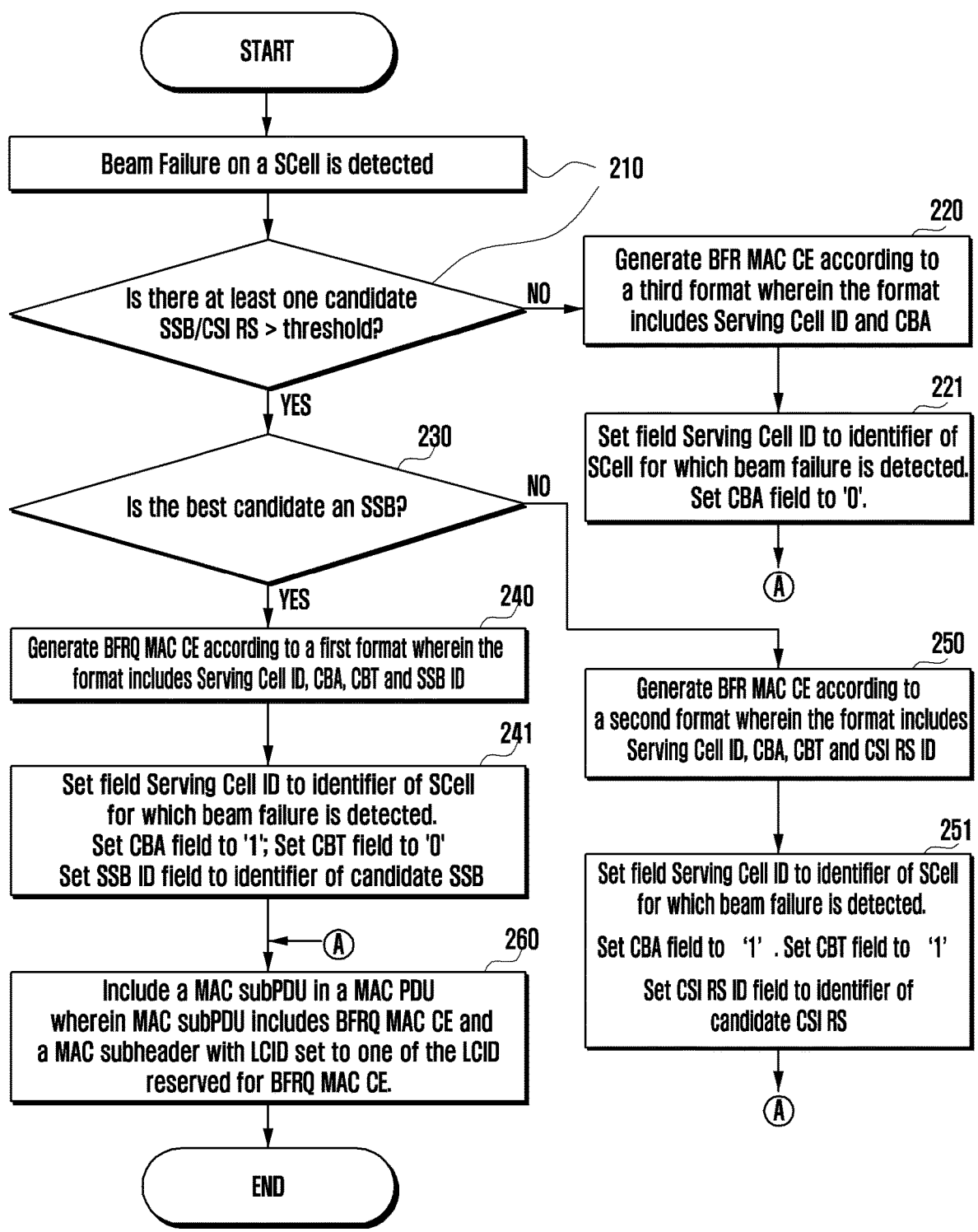
FIG. 2 illustrates the user equipment (UE) operation for generating BFR MAC CE according to an embodiment based on the first method of the disclosure.

FIGS. 1 through 27, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special-purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may also refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

A base station (BS) is an entity communicating with a user equipment (UE) and may be referred to as a BS, a base transceiver station (BTS), a node B (NB), an evolved NB (eNB), an access point (AP), a fifth generation (5G) NB (5GNB), or a next generation NB (gNB).

A UE is an entity communicating with a BS and may be referred to as a UE, a device, a mobile station (MS), a mobile equipment (ME), or a terminal.

UE may be configured with secondary serving cell(s) in addition to special cell (SpCell). Beam management for secondary cell (SCell) typically consists of following steps: receiving information by UE from gNB for SCell's beam failure detection and recovery; detecting beam failure by UE; UE triggering; triggering scheduling request (SR) for beam failure recovery (BFR) request by UE BFR if UL grant is not available; gNB allocating uplink (UL) grant upon receiving SR for BFR request; media access control (MAC) control element (CE) generation by UE for BFR request; UE transmitting generated MAC CE for BFR; and gNB activating one or more beams based on the received BFR request.

Information Signaled by gNB for SCell BFR:

For SCell's BFR, gNB may signal one or more information for BFR to UE via dedicated RRC signaling message. In one method of the disclosure, for SCell's BFR, gNB signals one or more of the following information:

List of Candidate Beam Reference Signals (RSs) (CandidateBeamRSList):

gNB signals a list of candidate beam RS. This list is different from the list of candidate beam RS signaled for SpCell BFR. If BFR is needed for SpCell as well as SCell, gNB signals separate list of candidate beam RS for SpCell and SCell. This list is separately configured for each SCell. During SCell's BFR of a specific SCell, UE selects one or more suitable candidate beams from this list of that SCell. A candidate beam in the list is suitable if its measured value (RS received power (RSRP) or RS received quality (RSRQ)) is above a threshold. Each candidate beam RS can be one of synchronization signal block (SSB) or channel state information (CSI) RS. In an embodiment, all candidate beam RS(s) included in the list are of same type, i.e., SSB or CSI-RS. In another embodiment, some candidate beam RS(s) included in the list are of type SSB and some candidate beam RS(s) included in the list are of type CSI-RS.

List of candidate beam RSs is signaled per bandwidth part (BWP) as beam configuration can be different in different BWP of SCell. List of candidate beam RSs may or may not be signaled for each configured BWP of SCell. For SCell's BFR, UE selects suitable candidate beam from list of candidate beam RSs signaled in BWP configuration of the active BWP of that SCell. beamFailureRecoveryConfigS-Cell information element (IE) can be defined and included in dedicated BWP configuration wherein the beamFailureRecoveryConfigSCell IE includes CandidateBeamRSList. An example of CandidateBeamRSList according to abstract syntax notation one (ASN.1) syntax is as follows:

```
candidateBeamRSList   SEQUENCE (SIZE(1..maxNrofCandidateBeams))
OF CandidateBeamRSBFR
    CandidateBeamRSBFR ::=  CHOICE {
        ssb       SSB-Index,
        csi-RS    NZP-CSI-RS-ResourceId
    }
```

Candidate Beam Selection Threshold (Rsrp-Threshold):

Threshold to select a suitable candidate beam. Threshold can be RSRP or RSRQ threshold. Threshold can be separately signaled for SSB based candidate beam and CSI-RS based candidate beam. In an embodiment, threshold is signaled only for SSB based candidate beam or CSI-RS based candidate beam and is applied for both types (i.e., SSB and CSI-RS) of candidate beams. Threshold(s) is signaled per BWP as beam configuration can be different in different BWP. Threshold may or may not be signaled for each configured BWP of SCell. For SCell's BFR, UE selects suitable candidate beam based on threshold signaled in BWP configuration of the active BWP of that SCell. beamFailureRecoveryConfigSCell IE can be defined and included in dedicated BWP configuration wherein the beamFailureRecoveryConfigSCell IE includes threshold(s).

Sr Information:

In an embodiment, SR information for SCell's BFR includes SR identifier. In an alternate embodiment, SR information or SCell's BFR includes a list of SR identifiers. SR information can be signaled in several ways:

SR information for SCell's BFR is signaled per BWP. SR information may or may not be signaled for each configured BWP of SCell. For SCell's BFR, UE uses SR information in BWP configuration of the active BWP of that SCell. beamFailureRecoveryConfigSCell IE can be defined and included in dedicated BWP configuration wherein the beamFailureRecoveryConfigSCell IE includes SR information.

SR information for SCell's BFR is signaled per SCell. For SCell's BFR, UE uses SR information corresponding to that SCell.

SR information for SCell's BFR is signaled per cell group. For SCell's BFR, UE uses SR information in configuration of cell group (master cell group (MCG) or secondary cell group (SCG)) to which that SCell belong.

If SR information for SCell's BFR is not signaled, all SR resource configurations configured in cell group of that SCell can be used by UE for that Scell's BFR. If SR information for SCell's BFR is not signaled, UE does not use any SR resource configuration and UE triggers random access.

SR identifier for BFR identifies the SR configuration to be used for SCell BFR. A list of SR configurations is configured per cell group via RRC message. SR identifier (schedulingRequestId) associated with each SR configuration is signaled by gNB. A SR configuration includes value of sr-ProhibitTimer and sr-TransMax and schedulingRequestId. In an embodiment, the list of SR configuration is same for BFR on SCell and for other events triggering SR. SR identifier for BFR identifies the SR configuration from this list. In another embodiment, the list of SR configuration is separately configured for BFR on SCell and for other events triggering SR. SR identifier for BFR identifies the SR configuration from the list of SR configuration configured for BFR. An example of a list of SR configurations (SchedulingRequestConfig) according to ASN.1 syntax is as follows:

```
schedulingRequestConfig   SchedulingRequestConfig
SchedulingRequestConfig ::=   SEQUENCE {
    schedulingRequestToAddModList   SEQUENCE (SIZE
(1..maxNrofSR-ConfigPerCellGroup)) OF SchedulingRequestToAddMod
}
SchedulingRequestToAddMod ::=   SEQUENCE {
    schedulingRequestId   SchedulingRequestId,
    sr-ProhibitTimer   ENUMERATED {ms1, ms2, ms4, ms8, ms16,
ms32, ms64, ms128}
    sr-TransMax   ENUMERATED { n4, n8, n16, n32, n64, spare3,
spare2, spare 1}
}
```

SR identifier also identifies the SR resource configuration to be used for BFR. SR resource configuration indicates the physical layer resources on physical UL control channel (PUCCH) which are used for transmitting SR. A list of SR resource configuration is configured (i.e., signaled by gNB) per BWP of serving cell(s) supporting PUCCH. SR identifier associated with a SR resource configuration is signaled by gNB. In an embodiment, the list of SR resource configuration is same for BFR on SCell and for other events triggering SR. SR identifier for BFR identifies the SR resource configuration from this list. In another embodiment, the list of SR resource configuration is separately configured for BFR on SCell and for other events triggering SR. SR identifier for BFR identifies the SR resource configuration from the list of SR resource configuration configured for BFR. An example of a list of SR resource configurations (schedulingRequestResourceToAddModList) according to ASN.1 syntax is as follows:

```
schedulingRequestResourceToAddModList   SEQUENCE (SIZE
(1..maxNrofSR-Resources)) OF SchedulingRequestResourceConfig
    SchedulingRequestResourceConfig ::=   SEQUENCE {
        schedulingRequestResourceId   SchedulingRequestResourceId,
        schedulingRequestID        SchedulingRequestId,
        periodicityAndOffset      CHOICE {
            sym2       NULL,
            sym6or7       NULL,
            sl1       NULL,
            sl4       INTEGER (0..3),
            sl5       INTEGER (0..4),
            sl8       INTEGER (0..7),
            sl10       INTEGER (0..9),
            sl16       INTEGER (0..15),
            sl20       INTEGER (0..19),
            sl40       INTEGER (0..39),
            sl80       INTEGER (0..79),
            sl160       INTEGER (0..159),
            sl320       INTEGER (0..319),
            sl640       INTEGER (0..639)
        }
        resource       PUCCH-ResourceId
    }
```

SR configuration and SR resource configuration identified by the SR identifier included in the SR information for SCell's BFR are used by the UE for transmitting SR for SCell BFR. In case SR resource configuration corresponding to SR identifier is available on multiple serving cells (e.g., SpCell and PUCCH SCell), UE can use both for transmitting SR for BFR.

Beam Failure Detection:

UE monitors synchronization signals (SSs) or CSI-RSs transmitted periodically and configured for detecting beam failure on Scell to assess if a beam failure trigger condition has been met and also to identify a new candidate beam. A beam failure is detected on Scell if number of consecutive detected beam failure instances within defined time duration (beamFailureDetectionTimer) exceeds a configured maximum number (beamFailureInstanceMaxCount). These signals for beam failure detection of an Scell can be transmitted by that Scell or by another serving cell quasi co-located (QCLed) with that Scell.

beamFailureDetectionTimer and beamFailureInstanceMaxCount are signaled by gNB per BWP. For beam failure detection of an Scell, UE uses the beamFailureInstanceMaxCount and beamFailureDetectionTimer signaled by gNB in active BWP of that Scell. A beam failure instance means that all serving beams in a set of beams configured for beam failure detection fails (i.e., hypothetical PDCCH block error rate (BLER) determined based on measurement of SS or CSI-RS is above a threshold).

gNB can signal RadioLinkMonitoringConfig IE for SCell wherein the RadioLinkMonitoringConfig includes a list of RadioLinkMonitoringRS, wherein the purpose of RS indicated by RadioLinkMonitoringRS is set to beam failure or purpose is omitted. UE monitors these RSs for beam failure detection. gNB can signal RadioLinkMonitoringConfig IE for SpCell wherein the RadioLinkMonitoringConfig includes a list of RadioLinkMonitoringRS, wherein the purpose of RS indicated by RadioLinkMonitoringRS is set to beam failure, radio link failure (RLF) or both. UE monitors the beam failure related RSs (i.e., purpose set to beam failure) for beam failure detection.

SR Trigger for BFR (BFR):

In an embodiment, upon detecting beam failure for an SCell, UE first triggers BFR for that SCell. UE further triggers SR for BFR if UL grant is not available for transmitting BFR MAC CE for SCell BFR. SR information for SCell BFR includes one or more SR identifiers for SCell BFR. If multiple SRs are linked (SR information for SCell BFR includes multiple scheduled requests identifiers) with the BFR for the SCell, multiple SRs are triggered simultaneously. The SR configuration and SR resource configuration is selected by UE as explained earlier. The purpose of SR is to inform gNB that there is beam failure on SCell, so that gNB can quickly provide UL grant for transmitting BFR MAC CE. UE also triggers generation of BFR MAC CE.

In another embodiment, upon detecting beam failure for an SCell, UE first triggers generation of BFR MAC CE. SR is triggered when BFR MAC CE is generated if UL grant is not available for transmitting BFR MAC CE for SCell BFR. SR information for SCell BFR includes one or more SR identifiers for SCell BFR. If multiple SRs are linked (SR information for SCell BFR includes multiple scheduled requests identifiers) with the BFR for the SCell, multiple SRs are triggered simultaneously. The purpose of SR is to inform gNB that there is beam failure on SCell, so that gNB can quickly provide UL grant for transmitting BFR MAC CE.

BFR MAC CE Generation:

Method 1: In one embodiment of the first method of this disclosure, BFR MAC CE includes one or more of the following information:

Serving Cell ID: This field identifies the SCell for which BFR is requested. UE sets this field to the identifier of SCell for which BFR is requested. The identifier of each SCell is indicated by gNB in RRC message, e.g., RRCReconfiguration message.

Candidate Beam Availability (CBA): This field indicates whether candidate SSB/CSI-RS above the configured threshold is available or not. Candidate SSB ID/CSI-RS ID is included only if there is at least one candidate SSB/CSI-RS above threshold is available. UE sets this field to '1' if candidate SSB/CSI-RS above the configured threshold is available. Otherwise, UE sets this field to '0'. If this field is set to '1', candidate SSB ID/CSI-RS ID is included. If this field is set to '0', candidate SSB ID/CSI-RS ID is not included.

Candidate Beam Type (CBT): Indicates whether the BFR MAC CE includes SSB ID or CSI-RS ID. UE sets this field to '0' if candidate beam is SSB. UE sets this field to '1' if candidate beam is CSI-RS. In another embodiment, UE sets this field to '1' if candidate beam is SSB and UE sets this field to '0' if candidate beam is CSI-RS.

SSB ID: Identifier of candidate SSB. Included if CBA is '1' and CBT is '0'.

CSI-RS ID: Identifier of candidate CSI-RS. Included if CBA is '1' and CBT is '1'.

CBT0 and CBT1 can be used to indicate CSI-RS ID and SSB ID respectively instead of CBT1 and CBT0.

FIG. 1 shows the various MAC CE formats based on information to be included in BFR MAC CE according to an embodiment based on the first method of the disclosure.

Referring to FIG. 1, the first format corresponds to BFR MAC CE format for reporting SSB based candidate beam. The second format corresponds to BFR MAC CE format for reporting CSI-RS based candidate beam. The third format corresponds to BFR MAC CE format when no candidate beam is available. UE generates BFR MAC CE according to one of three formats.

FIG. 2 illustrates the UE operation for generating BFR MAC CE according to an embodiment based on the first method of the disclosure.

Referring to FIG. 2, upon detecting beam failure on an SCell, UE detects if there is at least one candidate SSB/CSI-RS above configured threshold at operation 210. If not, UE generates BFR MAC CE according to a third format at operation 220. The third format includes Serving Cell ID and CBA. UE sets field Serving Cell ID to identifier of SCell for which beam failure is detected; and sets CBA field to '0' at operation 221.

If there is at least one candidate SSB/CSI-RS above configured threshold, UE determines whether best candidate is an SSB at operation 230. If the best candidate is an SSB, UE generates BFR MAC CE according to a first format at operation 240. The first format includes Serving Cell ID, CBA, CBT and SSB ID. UE sets field Serving Cell ID to identifier of SCell for which beam failure is detected; sets CBA field to '1'; sets CBT field to '0'; and sets SSB ID field to identifier of candidate SSB at operation 241.

If the best candidate is a CSI-RS, UE generates BFR MAC CE according to a second format at operation 250. The second format includes Serving Cell ID, CBA, CBT and CSI-RS ID. UE sets field Serving Cell ID to identifier of SCell for which beam failure is detected; sets CBA field to '1'; sets CBT field to '1'; and sets CSI-RS ID field to identifier of candidate CSI-RS at operation 251.

UE includes a MAC sub-protocol data unit (subPDU) in a MAC protocol data unit (PDU) at operation 260. MAC subPDU includes BFR MAC CE and a MAC subheader with logical channel identifier (LCID) set to one of the LCID reserved for BFR MAC CE. UE then transmits the MAC PDU.

Figure 3:
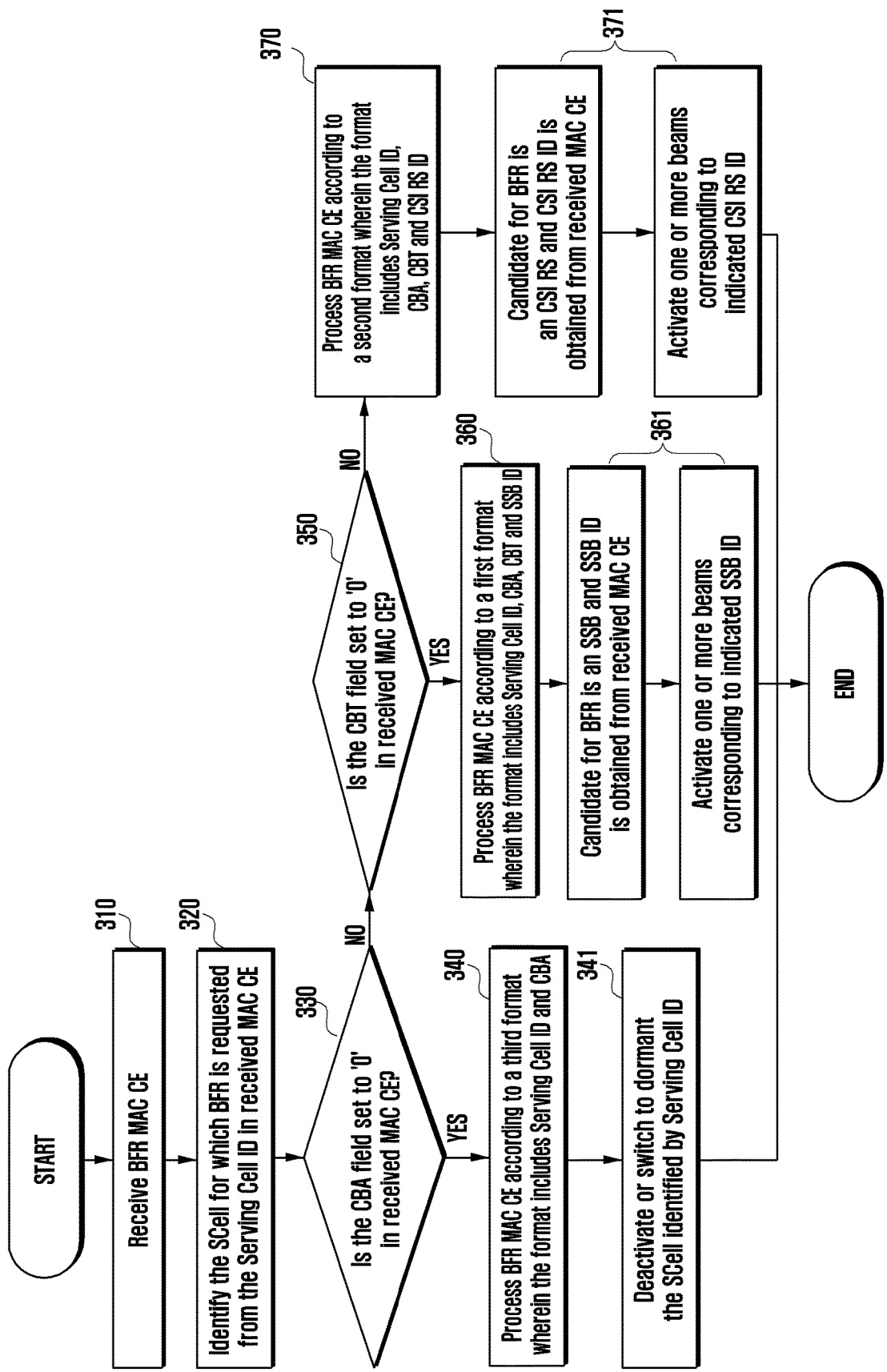
FIG. 3 illustrates next generation node B (gNB) operation upon receipt of BFR MAC CE from UE according to an embodiment based on the first method of the disclosure.

FIG. 3 illustrates gNB operation upon receipt of BFR MAC CE from UE according to an embodiment based on the first method of the disclosure.

Referring to FIG. 3, gNB receives BFR MAC CE at operation 310. gNB identifies the SCell for which BFR is requested from the Serving Cell ID in the received MAC CE at operation 320. gNB then checks whether the CBA field is set to '0' in received MAC CE at operation 330. If CBA field is set to '0' in received MAC CE, gNB processes BFR MAC CE according to a third format at operation 340. The third format includes Serving Cell ID and CBA. gNB deactivates or switches to dormant the SCell identified by Serving Cell ID at operation 341.

If CBA field is not set to '0' in received MAC CE, gNB checks whether CBT field is set to '0' in the received MAC CE at operation 350. If CBT field is set to '0' in the received MAC CE, gNB processes BFR MAC CE according to a first format at operation 360. The first format includes Serving Cell ID, CBA, CBT and SSB ID. Candidate for BFR is an SSB and SSB ID is obtained from received MAC CE; and gNB activates one or more beams corresponding to indicated SSB ID at operation 361.

If CBT field is not set to '0' in the received MAC CE, gNB processes BFR MAC CE according to a second format at operation 370. The second format includes Serving Cell ID, CBA, CBT and CSI-RS ID. Candidate for BFR is a CSI-RS and CSI-RS ID is obtained from received MAC CE; and gNB activates one or more beams corresponding to indicated CSI-RS ID at operation 371.

Figure 4:
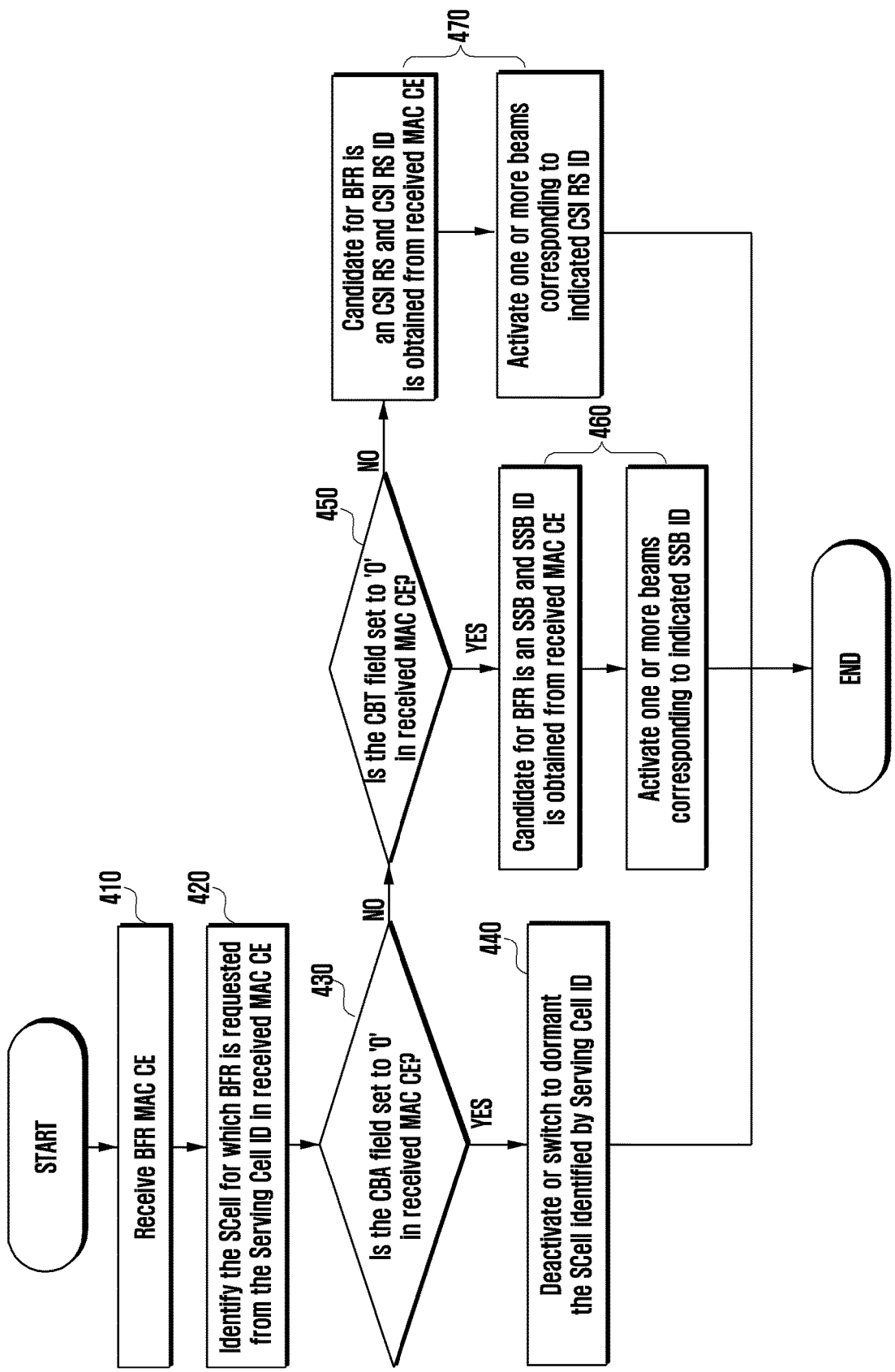
FIG. 4 illustrates gNB operation upon receipt of BFR MAC CE from UE according to another embodiment based on the first method of the disclosure.

FIG. 4 illustrates gNB operation upon receipt of BFR MAC CE from UE according to another embodiment based on the first method of the disclosure.

Referring to FIG. 4, gNB receives BFR MAC CE at operation 410. gNB identifies the SCell for which BFR is requested from the Serving Cell ID in the received MAC CE at operation 420. gNB then checks whether the CBA field is set to '0' in received MAC CE at operation 430. If CBA field is set to '0' in received MAC CE, gNB deactivates or switches to dormant the SCell identified by Serving Cell ID at operation 440. If CBA field is not set to '0' in received MAC CE, gNB checks whether CBT field is set to '0' in the received MAC CE at operation 450. If CBT field is set to '0' in the received MAC CE, candidate for BFR is an SSB and SSB ID is obtained from received MAC CE; and gNB activates one or more beams corresponding to indicated SSB ID at operation 460. If CBT field is not set to '0' in the received MAC CE, candidate for BFR is a CSI-RS and CSI-RS ID is obtained from received MAC CE; and gNB activates one or more beams corresponding to indicated CSI-RS ID at operation 470.

Figure 5:
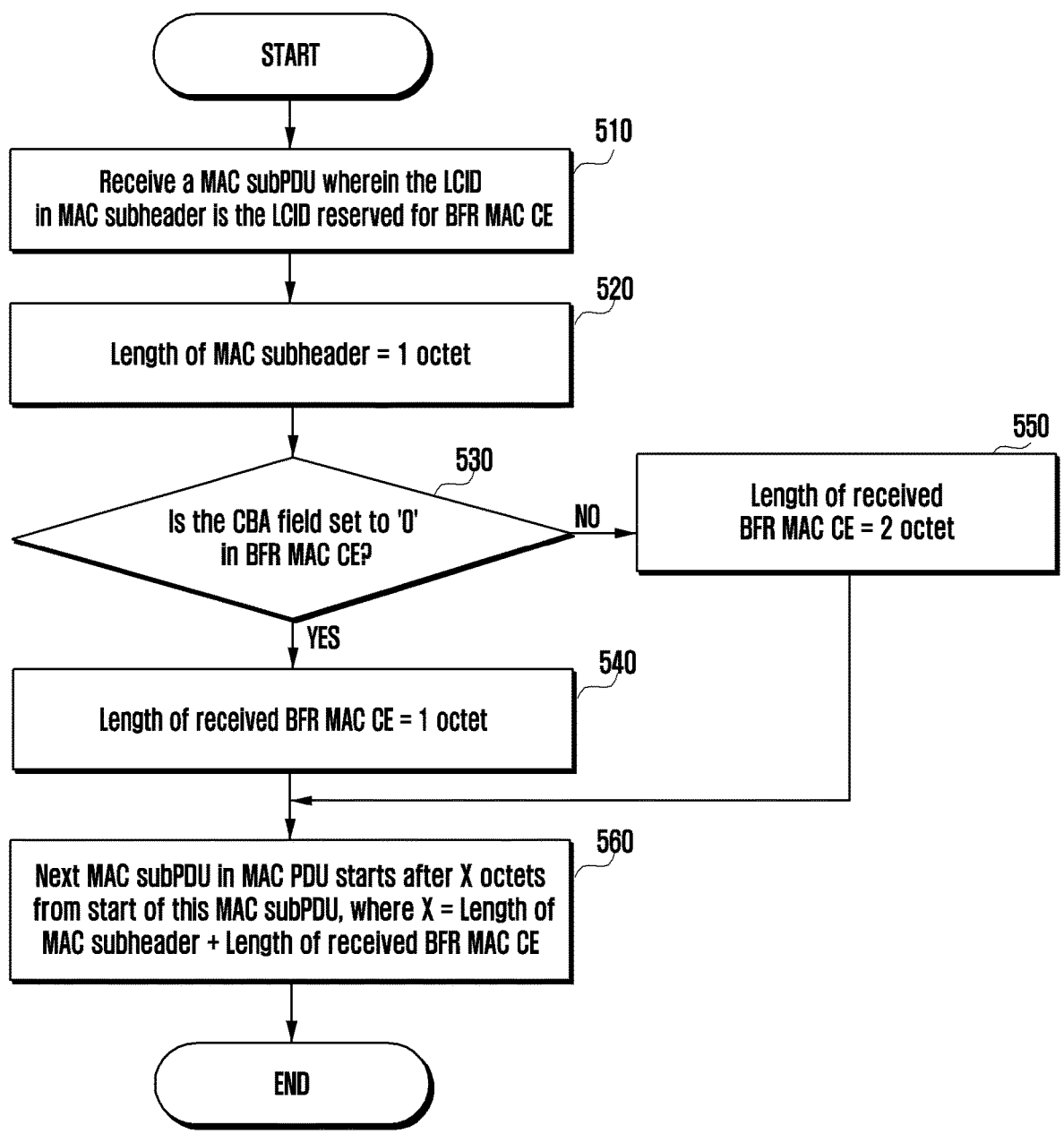
FIG. 5 illustrates gNB operation to determine the length of BFR MAC CE according to an embodiment of the disclosure.

FIG. 5 illustrates gNB operation to determine the length of BFR MAC CE according to an embodiment of the disclosure.

Referring to FIG. 5, gNB receives a MAC subPDU at operation 510. The LCID in MAC subheader is the LCID reserved for BFR MAC CE. gNB identifies that the length of MAC subheader is 1 octet at operation 520. gNB determines whether the CBA field is set to '0' in BFR MAC CE at operation 530. If the CBA field is set to '0' in BFR MAC CE, gNB determines that the length of received BFR MAC CE is 1 octet at operation 540. Otherwise, i.e., if the CBA field is set to '1' in BFR MAC CE, gNB determines that the length of received BFR MAC CE is 2 octets at operation 550. gNB identifies next MAC subPDU in MAC PDU starts after X octets from start of this MAC subPDU at operation 560, where X=Length of MAC subheader+Length of received BFR MAC.

In another embodiment of the first method of this disclosure, BFR MAC CE includes one or more of the following information:

Serving Cell ID: This field identifies the SCell for which BFR is requested. UE sets this field to the identifier of SCell for which BFR is requested.

Type: This field indicates whether candidate SSB/CSI-RS above the configured threshold is available or not. If available, the type field also indicates whether the request includes SSB ID or CSI-RS ID.

SSB ID: Identifier of candidate SSB. Included if type is '0'.

CSI-RS ID: Identifier of candidate CSI-RS. Included if type is '1'.

FIG. 6 shows the various MAC CE formats based on information to be included in BFR MAC CE according to another embodiment based on the first method of the disclosure.

Referring to FIG. 6, the first format corresponds to BFR MAC CE format for reporting SSB based candidate beam. The second format corresponds to BFR MAC CE format for reporting CSI-RS based candidate beam. The third format corresponds to BFR MAC CE format when no candidate beam is available. UE generates BFR MAC CE according to one of three formats.

Figure 7:
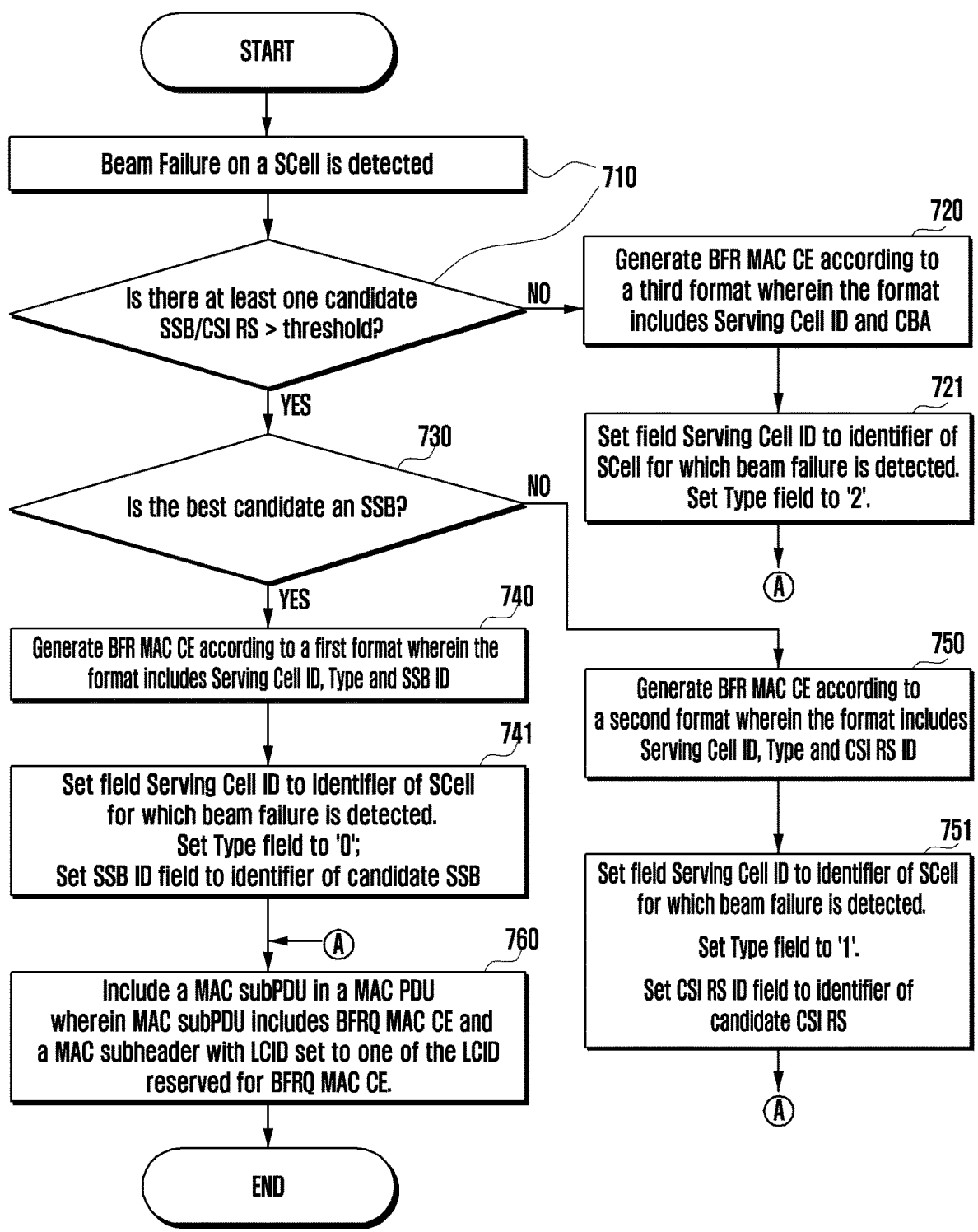
FIG. 7 illustrates the UE operation for generating BFR MAC CE according to another embodiment based on the first method of the disclosure.

FIG. 7 illustrates the UE operation for generating BFR MAC CE according to another embodiment based on the first method of the disclosure.

Referring to FIG. 7, upon detecting beam failure on an SCell, UE detects if there is at least one candidate SSB/CSI-RS above configured threshold at operation 710. If not, UE generates BFR MAC CE according to a third format at operation 720. The third format includes Serving Cell ID and Type. UE sets field Serving Cell ID to identifier of SCell for which beam failure is detected; and sets Type field to '2' at operation 721.

If there is at least one candidate SSB/CSI-RS above configured threshold, UE determines whether best candidate is an SSB at operation 730. If the best candidate is an SSB, UE generates BFR MAC CE according to a first format at operation 740. The first format includes Serving Cell ID, Type and SSB ID. UE sets field Serving Cell ID to identifier of SCell for which beam failure is detected; sets Type field to '0'; and sets SSB ID field to identifier of candidate SSB at operation 741.

If the best candidate is a CSI-RS, UE generates BFR MAC CE according to a second format at operation 750. The second format includes Serving Cell ID, Type and CSI-RS ID. UE sets field Serving Cell ID to identifier of SCell for which beam failure is detected; sets Type field to '1'; and sets CSI-RS ID field to identifier of candidate CSI-RS at operation 751.

UE includes a MAC subPDU in a MAC PDU at operation 760. MAC subPDU includes BFR MAC CE and a MAC subheader with LCID set to one of the LCID reserved for BFR MAC CE. UE then transmits the MAC PDU.

Figure 8:
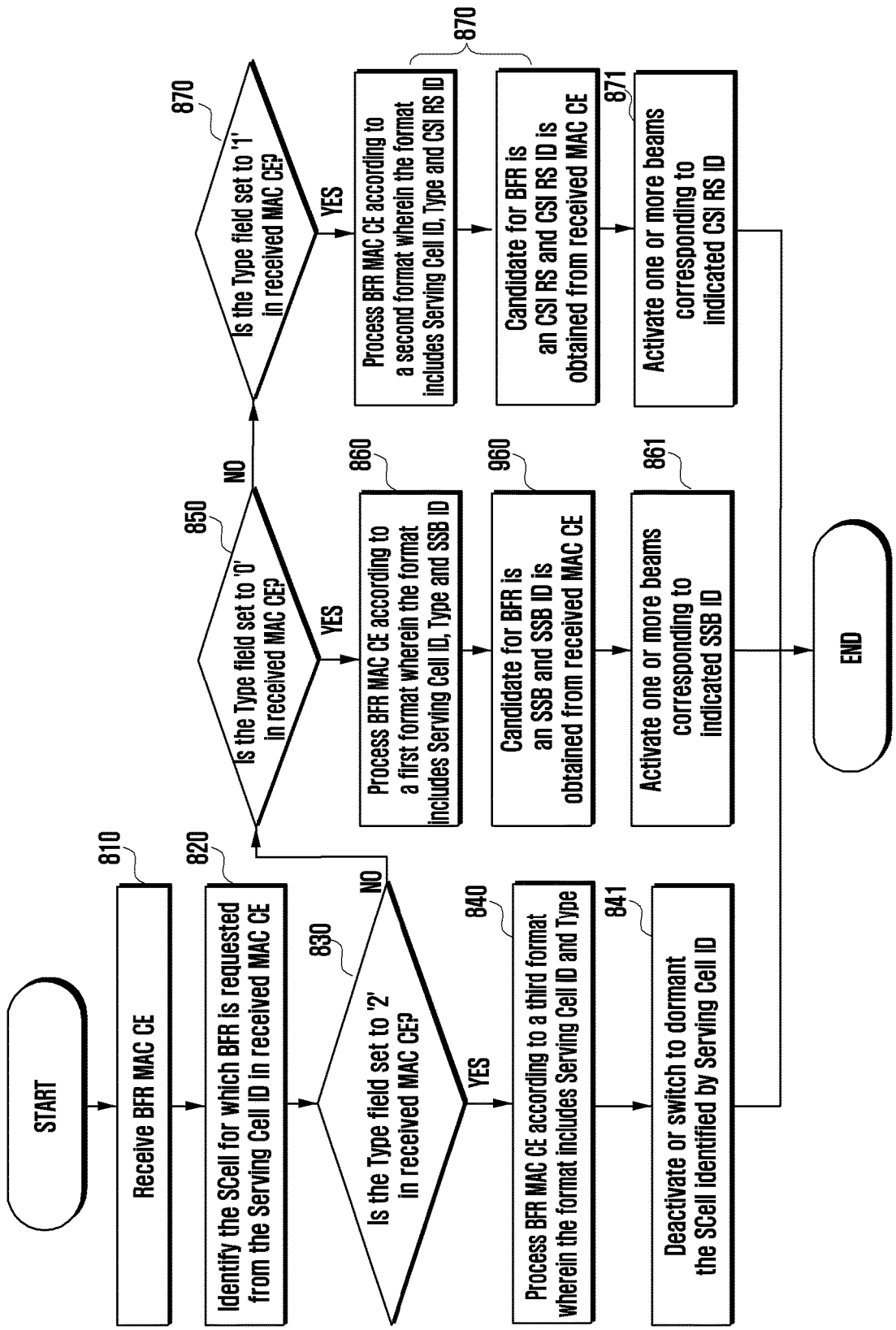
FIG. 8 illustrates gNB operation upon receipt of BFR MAC CE from UE according to another embodiment based on the first method of the disclosure.

FIG. 8 illustrates gNB operation upon receipt of BFR MAC CE from UE according to another embodiment based on the first method of the disclosure.

Referring to FIG. 8, gNB receives BFR MAC CE at operation 810. gNB identifies the SCell for which BFR is requested from the Serving Cell ID in the received MAC CE at operation 820. gNB then checks whether the Type field is set to '2' in received MAC CE at operation 830. If type field is set to '2' in received MAC CE, gNB processes BFR MAC CE according to a third format at operation 840. The third format includes Serving Cell ID and Type; and gNB deactivates or switches to dormant the SCell identified by Serving Cell ID at operation 841.

If type field is not set to '2' in received MAC CE, gNB checks whether Type field is set to '0' in the received MAC CE at operation 850. If type field is set to '0' in the received MAC CE, gNB processes BFR MAC CE according to a first format at operation 860. The first format includes Serving Cell ID, Type and SSB ID. Candidate for BFR is an SSB and SSB ID is obtained from received MAC CE; and gNB activates one or more beams corresponding to indicated SSB ID at operation 861.

If type field is set to one in the received MAC CE, gNB processes BFR MAC CE according to a second format at operation 870. The second format includes Serving Cell ID, Type and CSI-RS ID; Candidate for BFR is a CSI-RS and CSI-RS ID is obtained from received MAC CE; and gNB activates one or more beams corresponding to indicated CSI-RS ID at operation 871.

Figure 9:
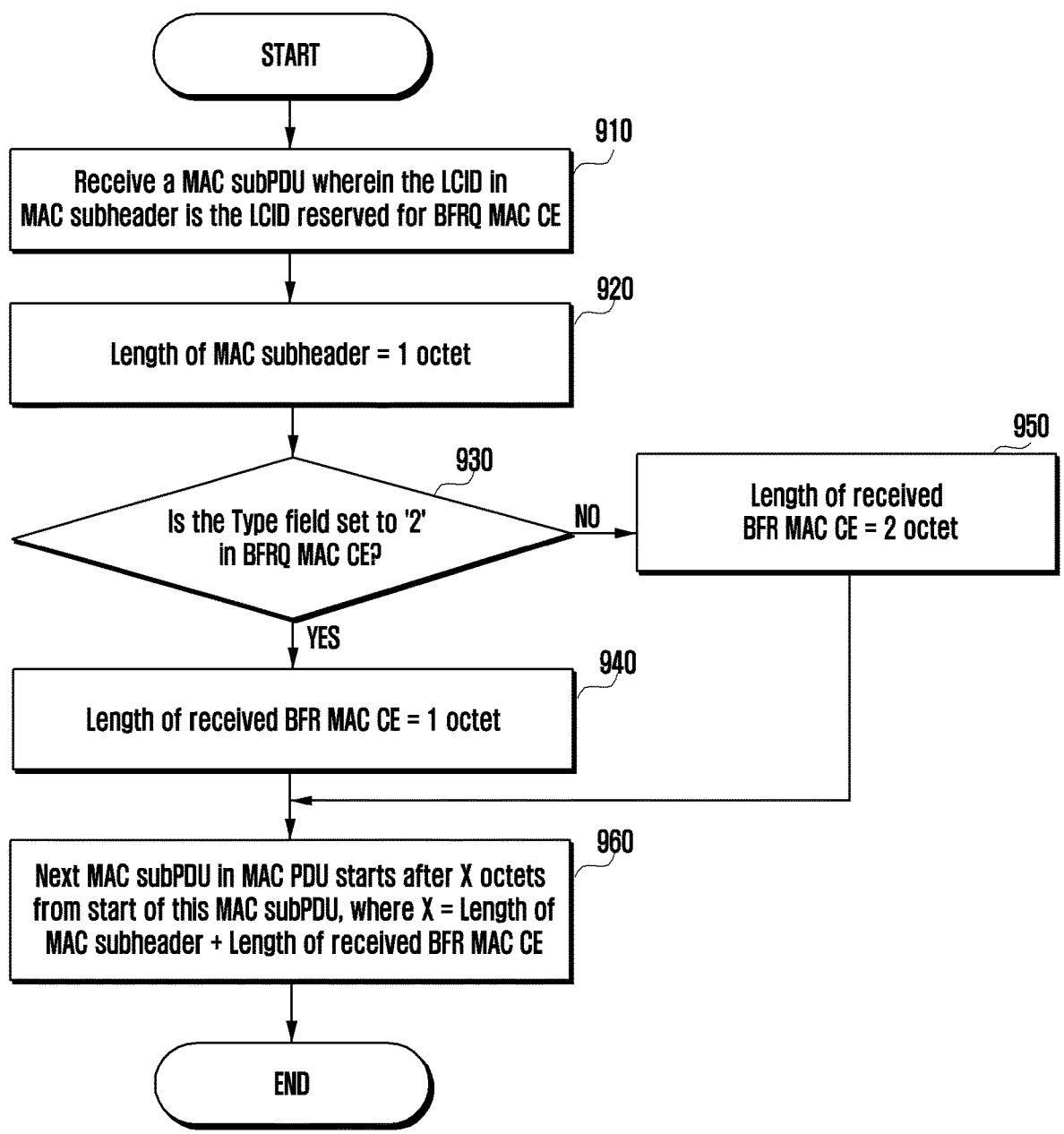
FIG. 9 illustrates gNB operation to determine the length of BFR MAC CE according to another embodiment of the disclosure.

FIG. 9 illustrates gNB operation to determine the length of BFR MAC CE according to another embodiment of the disclosure.

Referring to FIG. 9, gNB receives a MAC subPDU at operation 910. The LCID in MAC subheader is the LCID reserved for BFR MAC CE. gNB identifies that the length of MAC subheader is 1 octet at operation 920. gNB determines whether the Type field set to '2' in BFR MAC CE at operation 930. If the Type field set to '2' in BFR MAC CE, gNB determines that the length of received BFR MAC CE is 1 octet at operation 940. Otherwise, i.e., if the CBA field set to '0' or '1' in BFR MAC CE, gNB determines that the length of received BFR MAC CE is 2 octets at operation 950. gNB identifies next MAC subPDU in MAC PDU starts after X octets from start of this MAC subPDU at operation 960, where X=Length of MAC subheader+Length of received BFR MAC.

Method 2: In one embodiment of the second method of this disclosure, BFR MAC CE includes one or more of the following information:

Serving Cell ID: This field identifies the SCell for which BFR is requested. UE sets this field to the identifier of SCell for which BFR is requested.

CBA: This field indicates whether candidate SSB/CSI-RS above the configured threshold is available or not. Candidate SSB ID/CSI-RS ID is included in BFR MAC CE. UE sets this field to '1' if candidate SSB/CSI-RS above the configured threshold is available. Otherwise, UE sets this field to '0'. If candidate SSB ID/CSI-RS ID above threshold is not available, SSB ID/CSI-RS ID of best SSB/CSI-RS is included.

CBT: Indicates whether the BFR MAC CE includes SSB ID or CSI-RS ID. UE sets this field to '0' if candidate beam is SSB. UE sets this field to '1' if candidate beam is CSI-RS. In another embodiment, UE sets this field to '1' if candidate beam is SSB and UE sets this field to '0' if candidate beam is CSI-RS.

SSB ID: Identifier of candidate SSB. Included if CBT is '0'.

CSI-RS ID: Identifier of candidate CSI-RS. Included if CBT is '1'.

CBT0 and CBT1 can be used to indicate CSI-RS ID and SSB ID respectively instead of CBT1 and CBT0.

FIG. 10 shows the various MAC CE formats based on information to be included in BFR MAC CE according to an embodiment based on the second method of the disclosure.

Referring to FIG. 10, the first format corresponds to BFR MAC CE format for reporting SSB based candidate beam. The second format corresponds to BFR MAC CE format for reporting CSI-RS based candidate beam. UE generates BFR MAC CE according to one of the two formats.

Figure 11:
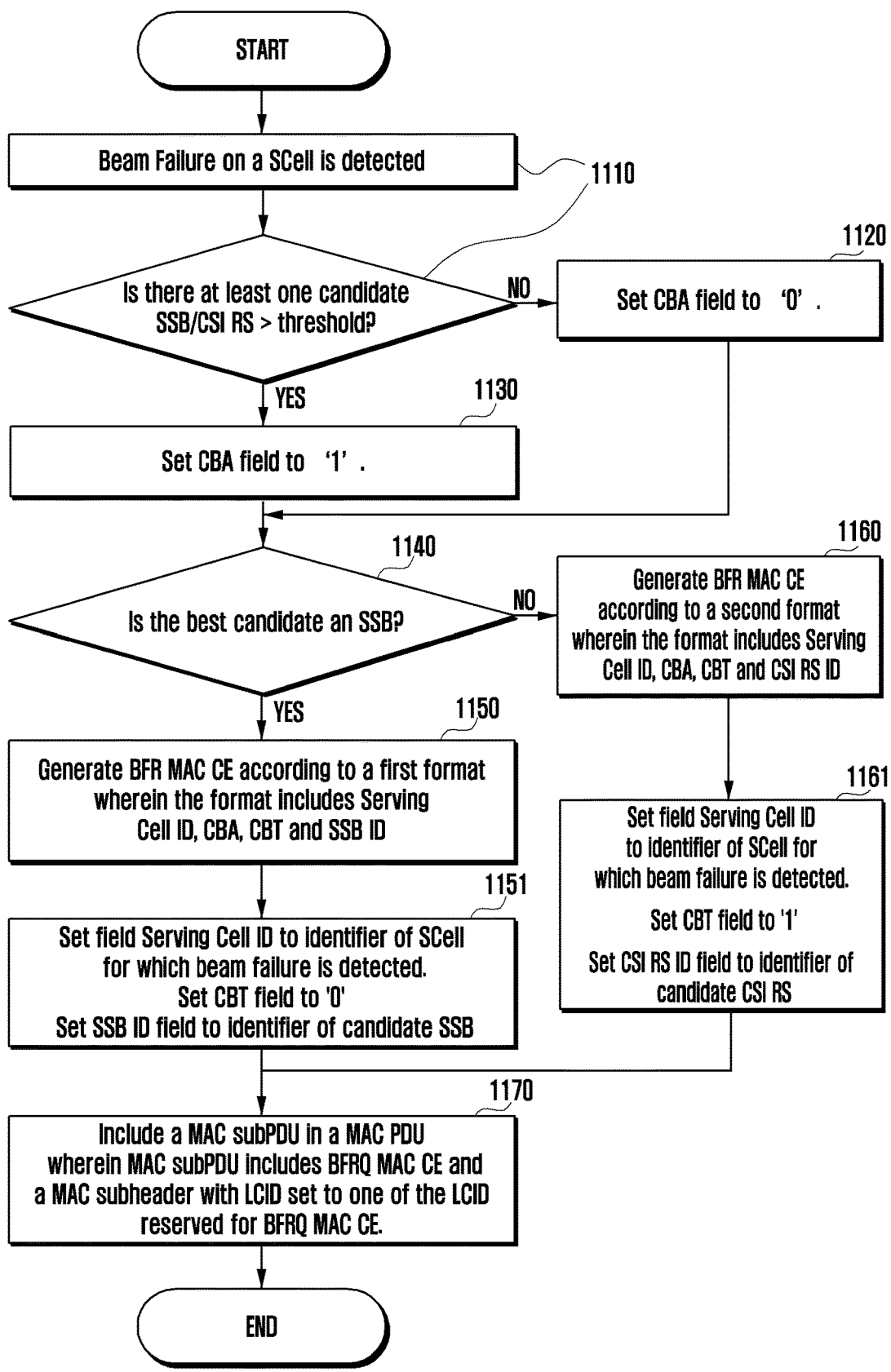
FIG. 11 illustrates the UE operation for generating BFR MAC CE according to an embodiment based on the second method of the disclosure.

FIG. 11 illustrates the UE operation for generating BFR MAC CE according to an embodiment based on the second method of the disclosure.

Referring to FIG. 11, upon detecting beam failure on an SCell, UE detects if there is at least one candidate SSB/CSI-RS above configured threshold at operation 1110. If not, UE sets CBA field to '0' at operation 1120. If yes, UE sets CBA filed to '1' at operation 1130. UE then determines whether best candidate is an SSB at operation 1140. If the best candidate is an SSB, UE generates BFR MAC CE according to a first format at operation 1150. The first format includes Serving Cell ID, CBA, CBT and SSB ID. UE sets field Serving Cell ID to identifier of SCell for which beam failure is detected; sets CBT field to '0'; and sets SSB ID field to identifier of candidate SSB at operation 1151.

If the best candidate is a CSI-RS, UE generates BFR MAC CE according to a second format at operation 1160. The second format includes Serving Cell ID, CBA, CBT and CSI-RS ID. UE sets field Serving Cell ID to identifier of SCell for which beam failure is detected; sets CBT field to '1'; and sets CSI-RS ID field to identifier of candidate CSI-RS at operation 1161.

UE includes a MAC subPDU in a MAC PDU at operation 1170. MAC subPDU includes BFR MAC CE and a MAC subheader with LCID set to one of the LCID reserved for BFR MAC CE. UE then transmits the MAC PDU.

Figure 12:
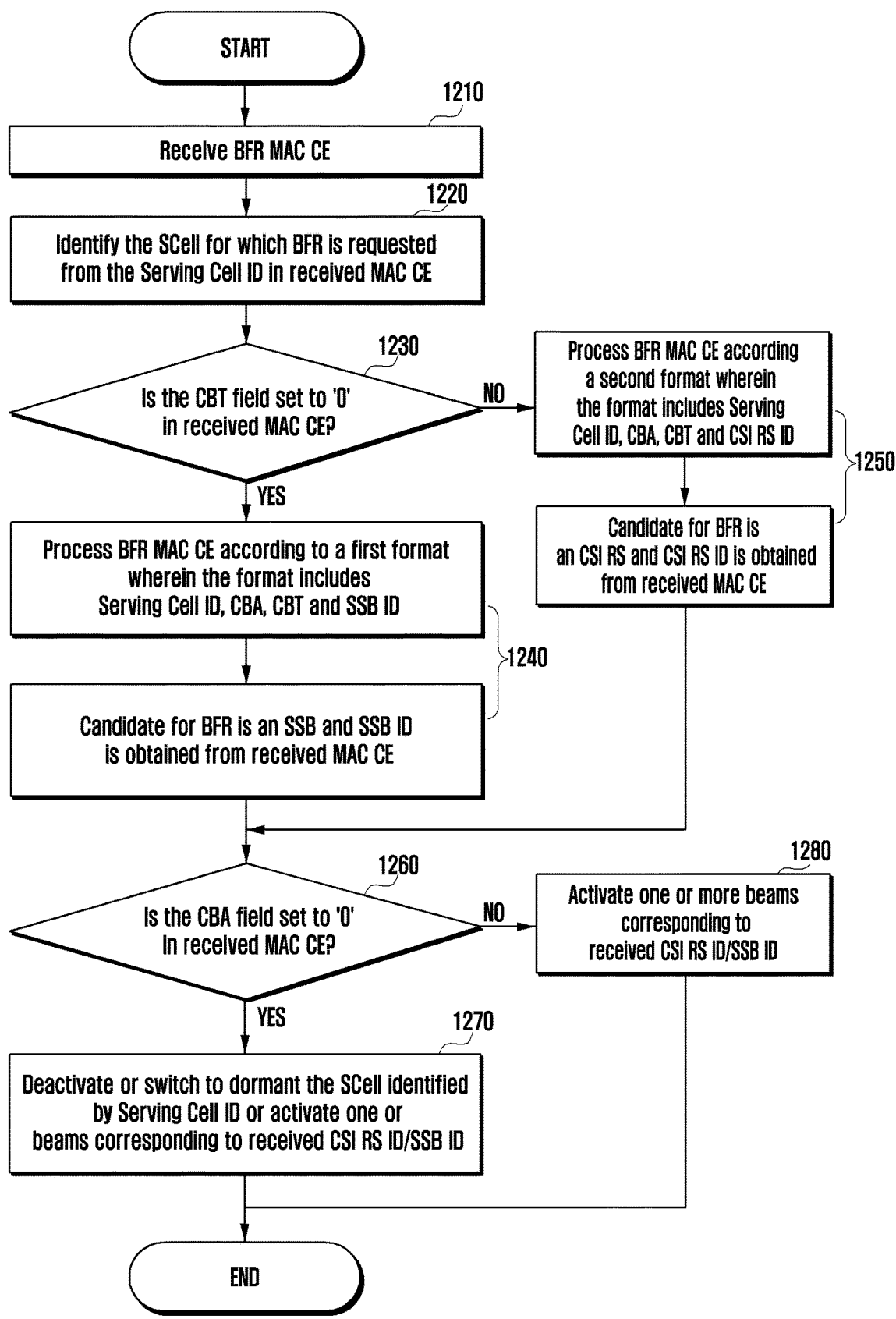
FIG. 12 illustrates gNB operation upon receipt of BFR MAC CE from UE according to an embodiment based on the second method of the disclosure.

FIG. 12 illustrates gNB operation upon receipt of BFR MAC CE from UE according to an embodiment based on the second method of the disclosure.

Referring to FIG. 12, gNB receives BFR MAC CE at operation 1210. gNB identifies the SCell for which BFR is requested from the Serving Cell ID in the received MAC CE at operation 1220. gNB checks whether CBT field is set to '0' in the received MAC CE at operation 1230. If CBT field is set to '0' in the received MAC CE, gNB processes BFR MAC CE according to a first format at operation 1240. The first format includes Serving Cell ID, CBA, CBT and SSB ID. Candidate for BFR is an SSB and SSB ID is obtained from received MAC CE. If CBT field is not set to '0' in the received MAC CE, gNB processes BFR MAC CE according to a second format at operation 1250. The second format includes Serving Cell ID, CBA, CBT and CSI-RS ID. Candidate for BFR is a CSI-RS and CSI-RS ID is obtained from received MAC CE.

gNB then checks whether the CBA field is set to '0' in received MAC CE at operation 1260. If CBA field is set to '0' in received MAC CE, gNB deactivates or switches to dormant the SCell identified by Serving Cell ID or activates one or beams corresponding to received CSI-RS ID/SSB ID at operation 1270. If CBA field is not set to '0' in received MAC CE, gNB activates one or more beams corresponding to received CSI-RS ID/SSB ID at operation 1280.

Method 3: In one embodiment of the third method of this disclosure, BFR MAC CE includes one or more of the following information:

Serving Cell ID: This field identifies the SCell for which BFR is requested. UE sets this field to the identifier of SCell for which BFR is requested.

CBA: This field indicates whether candidate SSB/CSI-RS above the configured threshold is available or not. Candidate SSB ID/CSI-RS ID is included only if there is at least one candidate SSB/CSI-RS above threshold is available. UE sets this field to '1' if candidate SSB/CSI-RS above the configured threshold is available.

SSB ID: Identifier of candidate SSB. Included if candidate is SSB.

CSI-RS ID: Identifier of candidate CSI-RS. Included if candidate is CSI-RS.

In an embodiment, instead of SSB ID and CSI-RS ID fields, candidate RS ID field can be included. This field is set to index of candidate SSB or candidate CSI-RS ID in the candidate beam RS list. For example, if candidate beam RS list includes 8 candidate RSs and candidate SSB or candidate CSI-RS ID for BFR is the fourth RS in the candidate RS list, candidate RS ID is set to 3. Candidate RS in in candidate RS list are indexed from 0 to size of list-1.

FIG. 13 shows the various MAC CE formats based on information to be included in BFR MAC CE according to an embodiment based on the third method of the disclosure.

Referring to FIG. 13, the first format corresponds to BFR MAC CE format for reporting SSB based candidate beam. The second format corresponds to BFR MAC CE format for reporting CSI-RS based candidate beam. The third format corresponds to BFR MAC CE format when no candidate beam is available. UE generates BFR MAC CE according to one of three formats.

Figure 14:
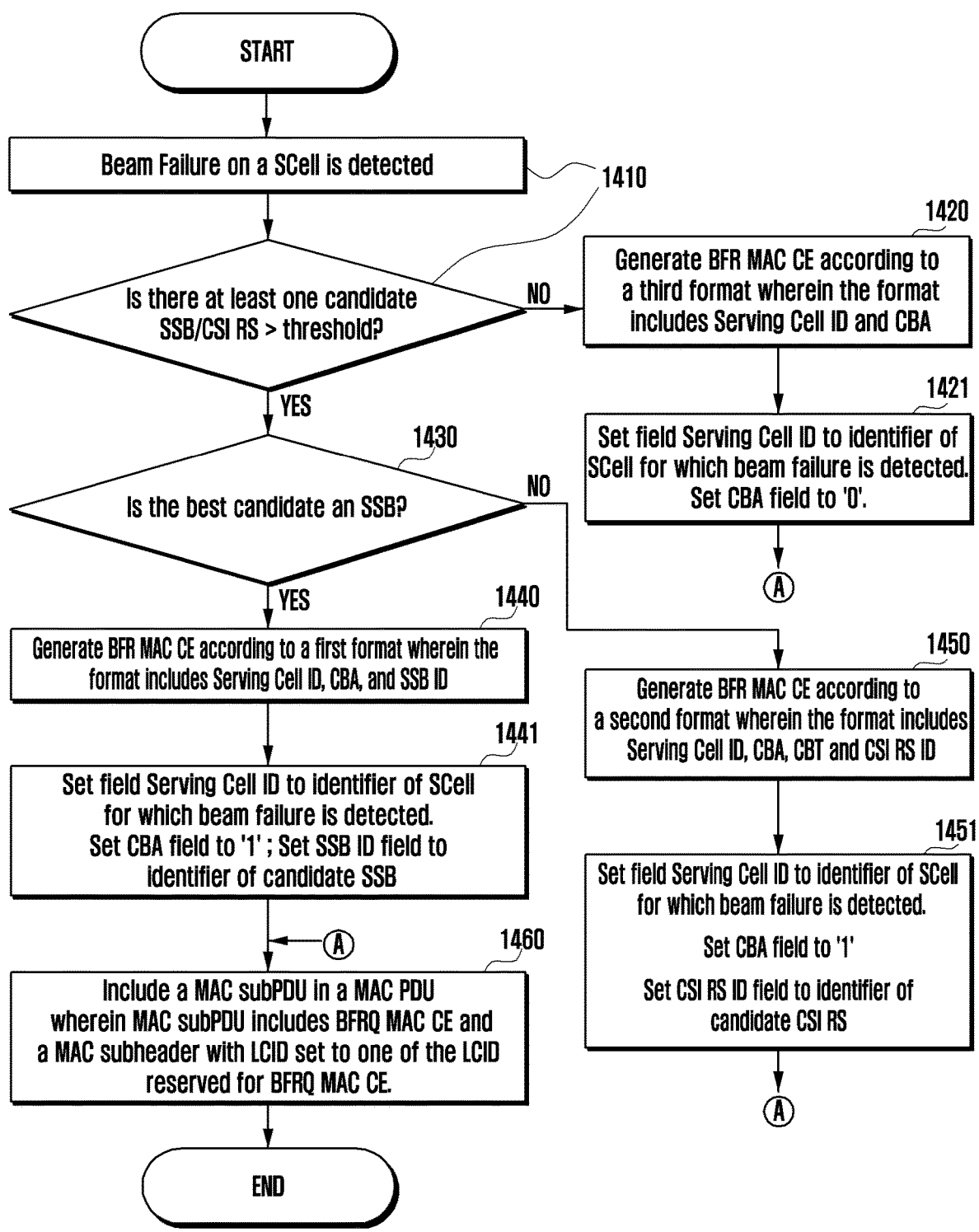
FIG. 14 illustrates the UE operation for generating BFR MAC CE according to an embodiment based on the third method of the disclosure.

FIG. 14 illustrates the UE operation for generating BFR MAC CE according to an embodiment based on the third method of the disclosure.

Referring to FIG. 14, upon detecting beam failure on an SCell, UE detects if there is at least one candidate SSB/CSI-RS above configured threshold at operation 1410. If not, UE generates BFR MAC CE according to a third format at operation 1420. The third format includes Serving Cell ID and CBA. UE sets field Serving Cell ID to identifier of SCell for which beam failure is detected; and sets CBA field to '0' at operation 1421.

If there is at least one candidate SSB/CSI-RS above configured threshold, UE determines whether best candidate is an SSB at operation 1430. If the best candidate is an SSB, UE generates BFR MAC CE according to a first format at operation 1440. The first format includes Serving Cell ID, CBA and SSB ID. UE sets field Serving Cell ID to identifier of SCell for which beam failure is detected; sets CBA field to '1'; and sets SSB ID field to identifier of candidate SSB at operation 1441.

If the best candidate is a CSI-RS, UE generates BFR MAC CE according to a second format at operation 1450. The format includes Serving Cell ID, CBA and CSI-RS ID. UE sets field Serving Cell ID to identifier of SCell for which beam failure is detected; sets CBA field to '1'; and sets CSI-RS ID field to identifier of candidate CSI-RS at operation 1451.

UE includes a MAC subPDU in a MAC PDU at operation 1460. MAC subPDU includes BFR MAC CE and a MAC subheader with LCID set to one of the LCID reserved for BFR MAC CE. UE then transmits the MAC PDU.

Figure 15:
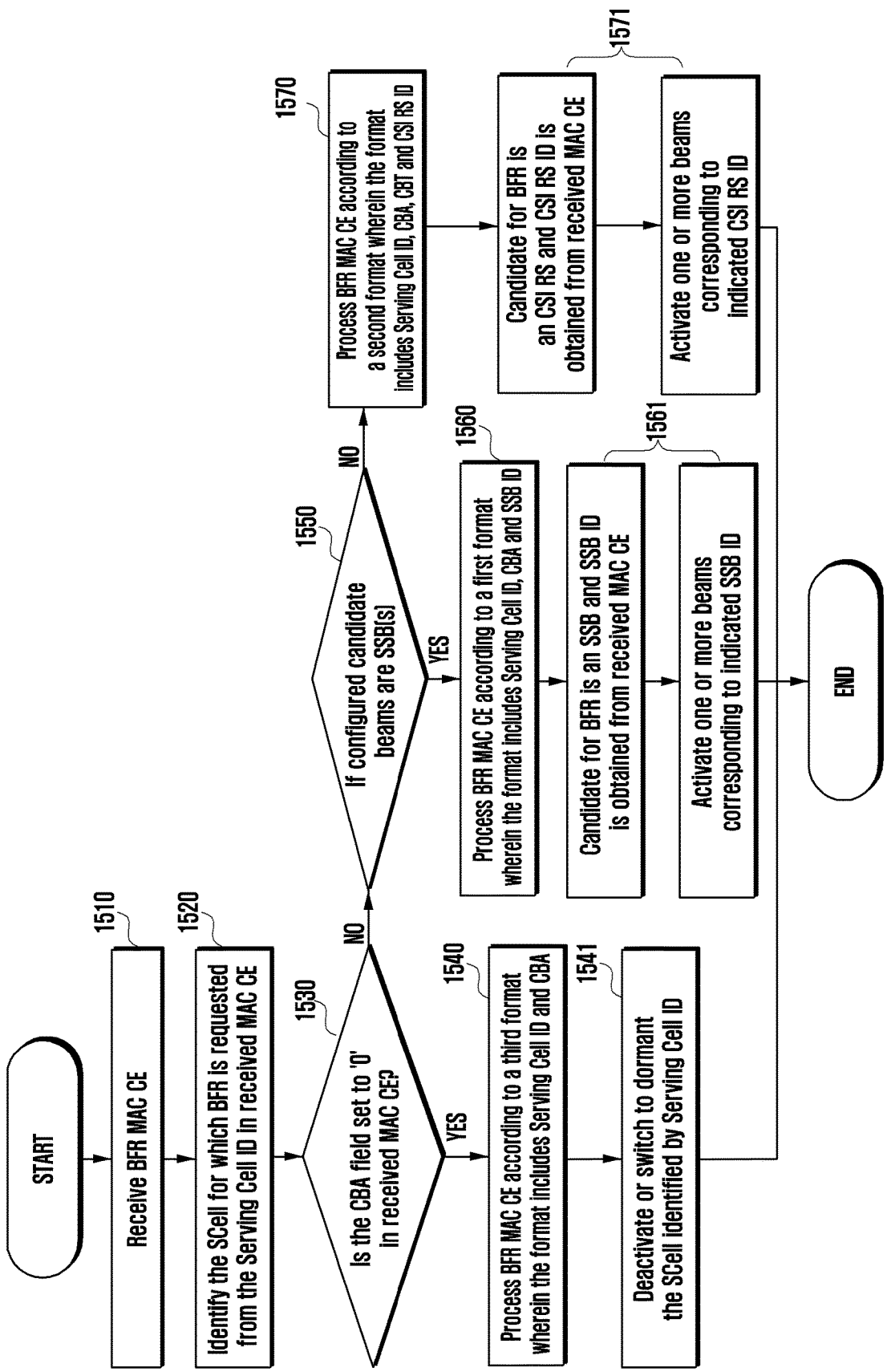
FIG. 15 illustrates gNB operation upon receipt of BFR MAC CE from UE according to an embodiment based on the third method of the disclosure.

FIG. 15 illustrates gNB operation upon receipt of BFR MAC CE from UE according to an embodiment based on the third method of the disclosure.

Referring to FIG. 15, gNB receives BFR MAC CE at operation 1510. gNB identifies the SCell for which BFR is requested from the Serving Cell ID in the received MAC CE at operation 1520. gNB then checks whether the CBA field is set to '0' in received MAC CE at operation 1530. If CBA field is set to '0' in received MAC CE, gNB processes BFR MAC CE according to a third format at operation 1540. The third format includes Serving Cell ID and CBA. gNB deactivates or switches to dormant the SCell identified by Serving Cell ID at operation 1541.

If CBA field is not set to '0' in received MAC CE, gNB checks whether configured candidate beams for BFR of the identified SCell are SSBs at operation 1550.

If yes, gNB processes BFR MAC CE according to a first format at operation 1560. The first format includes Serving Cell ID, CBA, and SSB ID. Candidate for BFR is an SSB and SSB ID is obtained from received MAC CE; and gNB activates one or more beams corresponding to indicated SSB ID at operation 1561.

If no, gNB processes BFR MAC CE according to a second format at operation 1570. The second format includes Serving Cell ID, CBA, CBT and CSI-RS ID. Candidate for BFR is a CSI-RS and CSI-RS ID is obtained from received MAC CE; and gNB activates one or more beams corresponding to indicated CSI-RS ID at operation 1571.

In another embodiment of third method of disclosure, instead of CBA field, a type field can be there.

Serving Cell ID: This field identifies the SCell for which BFR is requested. UE sets this field to the identifier of SCell for which BFR is requested.

Type (T): This field indicates whether candidate SSB/CSI-RS above the configured threshold is available or not. Candidate SSB ID/CSI-RS ID is included only if there is at least one candidate SSB/CSI-RS above threshold is available. UE sets this field to '1' if candidate SSB/CSI-RS above the configured threshold is available. Otherwise, UE sets this field to '0'. If candidate SSB ID/CSI-RS ID above threshold is not available, SSB ID/CSI-RS ID of best SSB/CSI-RS is included.

SSB ID: Identifier of candidate SSB. Included if candidate is SSB.

CSI-RS ID: Identifier of candidate CSI-RS. Included if candidate is CSI-RS.

FIG. 16 shows the various MAC CE formats based on information to be included in BFR MAC CE according to another embodiment based on the third method of the disclosure.

Referring to FIG. 16, the first format corresponds to BFR MAC CE format for reporting SSB based candidate beam. The second format corresponds to BFR MAC CE format for reporting CSI-RS based candidate beam. The third format corresponds to BFR MAC CE format when no candidate beam is available. UE generates BFR MAC CE according to one of three formats.

UE and gNB operation are same as in FIGS. 14 and 15 respectively, except that instead of setting/checking CBA field, type filed is set/checked by UE and gNB respectively.

Method 4: In one embodiment of the fourth method of this disclosure, BFR MAC CE includes one or more of the following information:

Serving Cell ID: This field identifies the SCell for which BFR is requested. UE sets this field to the identifier of SCell for which BFR is requested.

CBA: This field indicates whether candidate SSB/CSI-RS above the configured threshold is available or not. Candidate SSB ID/CSI-RS ID is included in BFR MAC CE. UE sets this field to '1' if candidate SSB/CSI-RS above the configured threshold is available. Otherwise, UE sets this field to '0'. If candidate SSB ID/CSI-RS ID above threshold is not available, SSB ID/CSI-RS ID of best SSB/CSI-RS is included.

SSB ID: Identifier of candidate SSB. Included if candidate is SSB.

CSI-RS ID: Identifier of candidate CSI-RS. Included if candidate is CSI-RS.

In an embodiment, instead of SSB ID and CSI-RS ID fields, candidate RS ID field can be included. This field is set to index of candidate SSB or candidate CSI-RS ID in the candidate beam RS list. For example, if candidate beam RS list includes 8 candidate RSs and candidate SSB or candidate CSI-RS ID for BFR is the fourth RS in the candidate RS list, candidate RS ID is set to 3. Candidate RS in in candidate RS list are indexed from 0 to size of list-1.

FIG. 17 shows the various MAC CE formats based on information to be included in BFR MAC CE according to an embodiment based on the fourth method of the disclosure.

Referring to FIG. 17, the first format corresponds to BFR MAC CE format for reporting SSB based candidate beam. The second format corresponds to BFR MAC CE format for reporting CSI-RS based candidate beam. UE generates BFR MAC CE according to one of the two formats.

Figure 18:
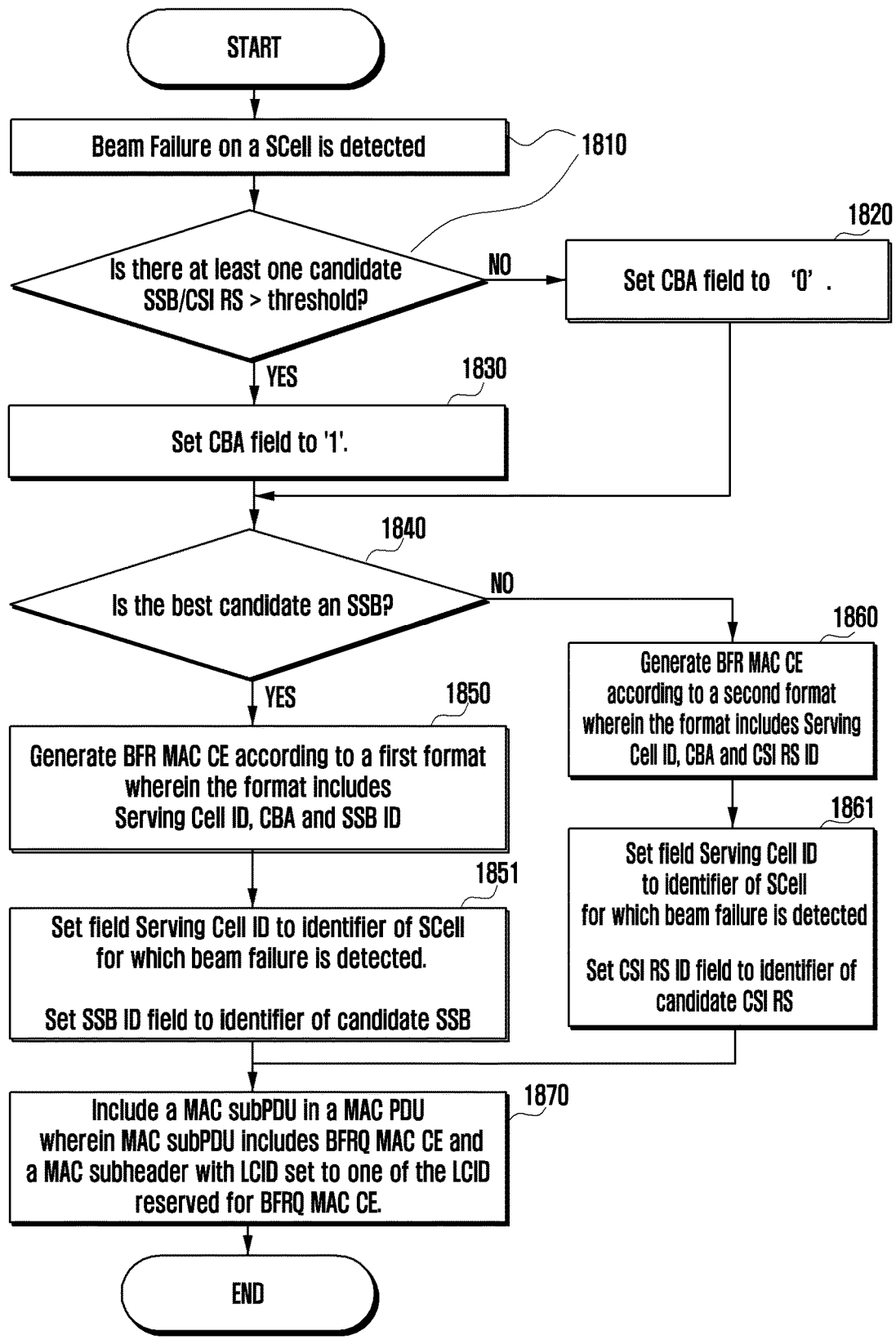
FIG. 18 illustrates the UE operation for generating BFR MAC CE according to an embodiment based on the fourth method of the disclosure.

FIG. 18 illustrates the UE operation for generating BFR MAC CE according to an embodiment based on the fourth method of the disclosure.

Referring to FIG. 18, upon detecting beam failure on an SCell, UE detects if there is at least one candidate SSB/CSI-RS above configured threshold at operation 1810. If not, UE sets CBA field to '0' at operation 1820. If yes, UE sets CBA filed to '1' at operation 1830. UE then determines whether best candidate is an SSB at operation 1840. If the best candidate is an SSB, UE generates BFR MAC CE according to a first format at operation 1850. The first format includes Serving Cell ID, CBA and SSB ID. UE sets field Serving Cell ID to identifier of SCell for which beam failure is detected; and sets SSB ID field to identifier of candidate SSB at operation 1851.

If the best candidate is a CSI-RS, UE generates BFR MAC CE according to a second format at operation 1860. The second format includes Serving Cell ID, CBA and CSI-RS ID. UE sets field Serving Cell ID to identifier of SCell for which beam failure is detected; and sets CSI-RS ID field to identifier of candidate CSI-RS at operation 1861.

UE includes a MAC subPDU in a MAC PDU at operation 1870. MAC subPDU includes BFR MAC CE and a MAC subheader with LCID set to one of the LCID reserved for BFR MAC CE. UE then transmits the MAC PDU.

Figure 19:
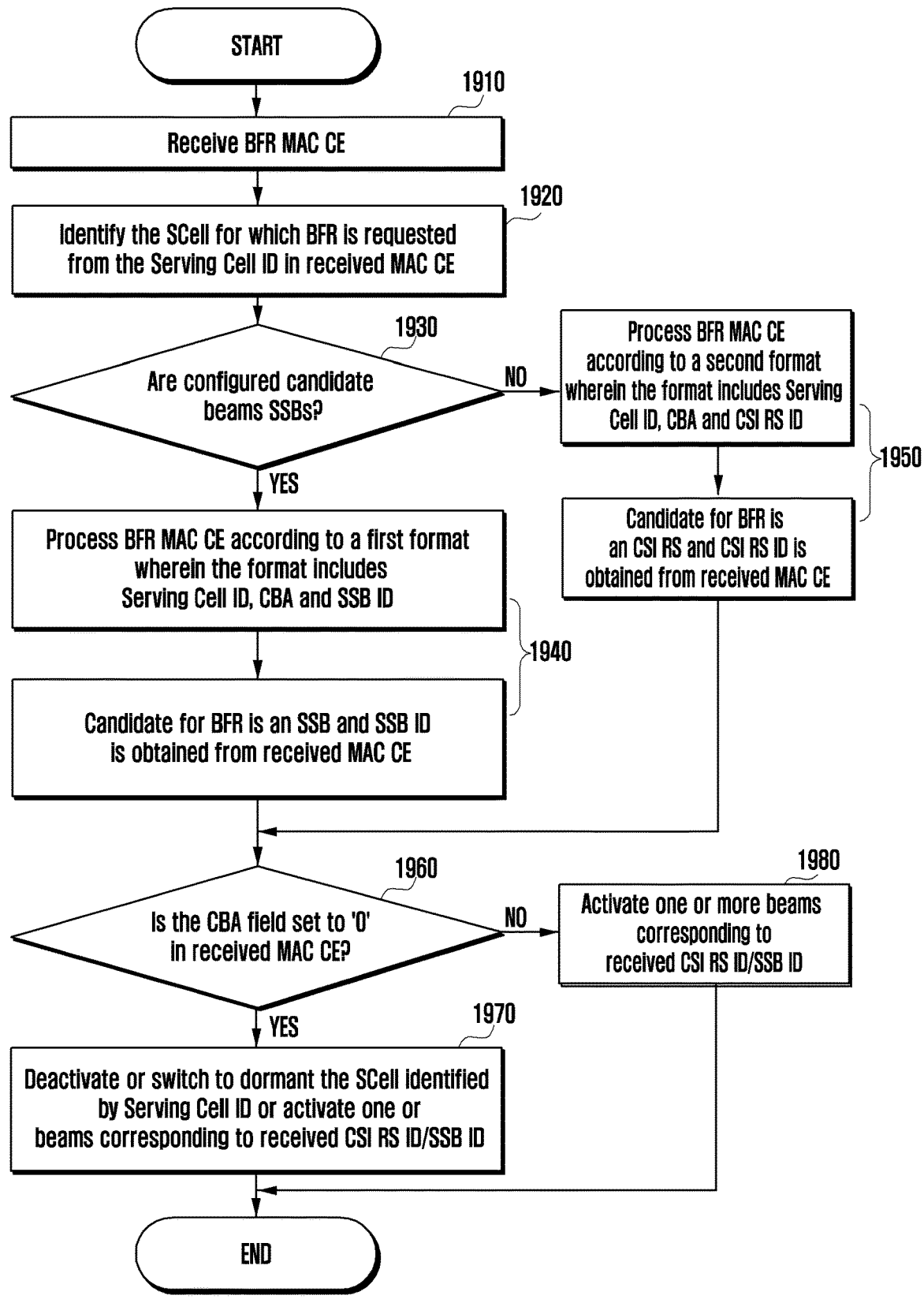
FIG. 19 illustrates gNB operation upon receipt of BFR MAC CE from UE according to an embodiment based on the fourth method of the disclosure.

FIG. 19 illustrates gNB operation upon receipt of BFR MAC CE from UE according to an embodiment based on the fourth method of the disclosure.

Referring to FIG. 19, gNB receives BFR MAC CE at operation 1910. gNB identifies the SCell for which BFR is requested from the Serving Cell ID in the received MAC CE at operation 1920. gNB checks whether configured candidate beams for BFR of the identified SCell are SSBs at operation 1930.

If yes, gNB processes BFR MAC CE according to a first format at operation 1940. The first format includes Serving Cell ID, CBA and SSB ID. Candidate for BFR is an SSB and SSB ID is obtained from received MAC CE.

If no, gNB processes BFR MAC CE according to a second format at operation 1950. The second format includes Serving Cell ID, CBA and CSI-RS ID. Candidate for BFR is a CSI-RS and CSI-RS ID is obtained from received MAC CE.

gNB then checks whether the CBA field is set to '0' in received MAC CE at operation 1960. If CBA field is set to '0' in received MAC CE, gNB deactivates or switches to dormant the SCell identified by Serving Cell ID or activates one or beams corresponding to received CSI-RS ID/SSB ID at operation 1970. If CBA field is not set to '0' in received MAC CE, gNB activates one or more beams corresponding to received CSI-RS ID/SSB ID at operation 1980.

In Methods 1 to 4, MAC CE can also be used for BFR of multiple SCells concurrently, by including the defined fields in each of these methods for each SCell.

Figure 20:
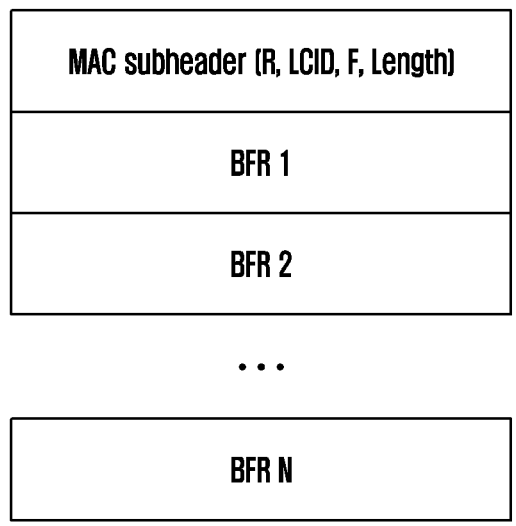
FIG. 20 illustrates an example MAC subPDU carrying BFR MAC CE according to an embodiment of the disclosure.

FIG. 20 illustrates an example MAC subPDU carrying BFR MAC CE according to an embodiment of the disclosure.

BFR information 1 to N in FIG. 20 follows one of the formats defined in Methods 1-4.

In one method of disclosure, instead of reporting a single SSB/CSI-RS, multiple SSBs/CSI-RSs can be indicated in BFR MAC CE. In one method, 'N' best SSB/CSI-RS above threshold can be indicated. N can be signaled by gNB, e.g., in BFR configuration. In an embodiment, RSRP/RSRQ values for each reported SSB/CSI-RS can also be included in BFR MAC CE.

Method 5:

In one embodiment of the fifth method of this disclosure, BFR MAC CE includes one or more of the following information:

Serving Cell Bitmap: This field identifies the SCells for which beam failure is detected (or in other words BFR is requested). Ci bit in bitmap corresponds to serving cell with ServCellIndex i. Ci bit is set to 1 if beam failure is detected and BFR information for SCell associated with this bit (i.e., SCell with ServCellIndex i) is included.

Beam Failure Recovery Info: BFR information indicates candidate beam information of SCell for which the associated Ci bit is set to 1. BFR information for SCell for which the associated Ci bit is set to 0 is not included. BFR information of SCells is included after the Serving Cell Bitmap in ascending order based on the ServCellIndex.

Embodiment 1: FIG. 21 shows format and various fields of beam information according to one embodiment based on the fifth method of the disclosure.

In this embodiment, description of fields CBA, CBT, SSB ID and CSI-RS ID are same as in first embodiment of Method 1.

CBA: This field indicates whether candidate SSB/CSI-RS above the configured threshold is available or not. Candidate SSB ID/CSI-RS ID is included only if there is at least one candidate SSB/CSI-RS above threshold is available. UE sets this field to '1' if candidate SSB/CSI-RS above the configured threshold is available. Otherwise, UE sets this field to '0'. If this field is set to '1', candidate SSB ID/CSI-RS ID is included. If this field is set to '0' candidate SSB ID/CSI-RS ID is not included.

CBT: Indicates whether the BFR MAC CE includes SSB ID or CSI-RS ID. UE sets this field to '0' if candidate beam is SSB. UE sets this field to '1' if candidate beam is CSI-RS. In another embodiment, UE sets this field to '1' if candidate beam is SSB and UE sets this field to '0' if candidate beam is CSI-RS.

SSB ID: Identifier of candidate SSB. Included if CBA is '1' and CBT is '0'.

CSI-RS ID: Identifier of candidate CSI-RS. Included if CBA is '1' and CBT is '1'. CBT0 and CBT1 can be used to indicate CSI-RS ID and SSB ID respectively instead of CBT1 and CBT0.

Embodiment 2: FIG. 22 shows format and various fields of beam information according to another embodiment based on the fifth method of the disclosure.

In this embodiment, description of fields Type, SSB ID and CSI-RS ID are same as in second embodiment of Method 1.

Type: This field indicates whether candidate SSB/CSI-RS above the configured threshold is available or not. If available, the type field also indicates whether the request includes SSB ID or CSI-RS ID.

SSB ID: Identifier of candidate SSB. Included if type is '0'.

CSI-RS ID: Identifier of candidate CSI-RS. Included if type is '1'.

Embodiment 3: FIG. 23 shows format and various fields of beam information according to another embodiment based on the fifth method of the disclosure.

In this embodiment, description of fields CBA, SSB ID and CSI-RS ID are same as in Method 2.

CBA: This field indicates whether candidate SSB/CSI-RS above the configured threshold is available or not. Candidate SSB ID/CSI-RS ID is included in BFR MAC CE. UE sets this field to '1' if candidate SSB/CSI-RS above the configured threshold is available. Otherwise, UE sets this field to '0'. If candidate SSB ID/CSI-RS ID above threshold is not available, SSB ID/CSI-RS ID of best SSB/CSI-RS is included.

CBT: Indicates whether the BFR MAC CE includes SSB ID or CSI-RS ID. UE sets this field to '0' if candidate beam is SSB. UE sets this field to '1' if candidate beam is CSI-RS. In another embodiment, UE sets this field to '1' if candidate beam is SSB and UE sets this field to '0' if candidate beam is CSI-RS.

SSB ID: Identifier of candidate SSB. Included if CBT is '0'.

CSI-RS ID: Identifier of candidate CSI-RS. Included if CBT is '1'. CBT0 and CBT1 can be used to indicate CSI-RS ID and SSB ID respectively instead of CBT1 and CBT0.

Embodiment 4: FIG. 24 shows format and various fields of beam information according to another embodiment based on the fifth method of the disclosure.

In this embodiment, description of fields CBA, SSB ID and CSI-RS ID are same as in in first embodiment of Method 3.

CBA: This field indicates whether candidate SSB/CSI-RS above the configured threshold is available or not. Candidate SSB ID/CSI-RS ID is included only if there is at least one candidate SSB/CSI-RS above threshold is available. UE sets this field to '1' if candidate SSB/CSI-RS above the configured threshold is available. Otherwise, UE sets this field to '0'. If this field is set to '1', candidate SSB ID/CSI-RS ID is included. If this field is set to '0' candidate SSB/CSI-RS ID is not included.

SSB ID: Identifier of candidate SSB. Included if candidate is SSB.

CSI-RS ID: Identifier of candidate CSI-RS. Included if candidate is CSI-RS.

In an embodiment, instead of SSB ID and CSI-RS ID fields, candidate RS ID field can be included. This field is set to index of candidate SSB or candidate CSI-RS ID in the candidate beam RS list. For example, if candidate beam RS list includes 8 candidate RSs and candidate SSB or candidate CSI-RS ID for BFR is the fourth RS in the candidate RS list, candidate RS ID is set to 3. Candidate RS in in candidate RS list are indexed from 0 to size of list-1.

Embodiment 5: FIG. 25 shows format and various fields of beam information according to another embodiment based on the fifth method of the disclosure.

In this embodiment, description of fields CBA, SSB ID and CSI-RS ID are same as in second embodiment of Method 3.

CBA: This field indicates whether candidate SSB/CSI-RS above the configured threshold is available or not. Candidate SSB ID/CSI-RS ID is included in BFR MAC CE. UE sets this field to '1' if candidate SSB/CSI-RS above the configured threshold is available. Otherwise, UE sets this field to '0'. If candidate SSB ID/CSI-RS ID above threshold is not available, SSB ID/CSI-RS ID of best SSB/CSI-RS is included.

SSB ID: Identifier of candidate SSB. Included if candidate is SSB.

CSI-RS ID: Identifier of candidate CSI-RS. Included if candidate is CSI-RS.

In one embodiment of disclosure in Method 5, instead of reporting a single SSB/CSI-RS, multiple SSBs/CSI-RSs can be indicated in BFR MAC CE. In another embodiment, 'N' best SSB/CSI-RS above threshold can be indicated. N can be signaled by gNB, e.g., in BFR configuration. In an embodiment, RSRP/RSRQ values for each reported SSB/CSI-RS can also be included in BFR MAC CE.

In one embodiment of Methods 1 to 5 explained above, CBA field is not included in BFR MAC CE. SSB ID/CSI-RS ID corresponding to candidate SSB/CSI-RS is included wherein SSB/CSI-RS is candidate if measured RSRP/RSRQ is above threshold. If none of SSB/CSI-RS is above threshold, either UE does not send BFR MAC CE or UE sends by including any or best SSB/CSI-RS.

BFR MAC CE Transmission:

There can be several serving cells via which UE is communicating with network. There can be one or more serving cells in each cell group (CG) (MCG, SCG). Once the BFR MAC CE generated, issue is where the UE should transmit this MAC CE.

In one embodiment of this disclosure, UE transmits the BFR MAC CE for SCell of a CG to SpCell of that CG. In other words, UE transmits BFR MAC CE for SCell of a CG in the UL grant for transmission on SpCell of that CG. In this embodiment, if BFR MAC CE supports BFR information for multiple serving cells, all serving cells for which BFR information is included in generated MAC CE belong to same CG.

In another embodiment of this disclosure, UE transmits the BFR MAC CE for SCell of a CG to any serving cell (can be SpCell or SCell) of that CG. In other words, UE transmits BFR MAC CE for SCell of a CG in the UL grant for transmission on any serving cell of that CG. The advantage is that BFR information for SCell can be transmitted in the earliest available UL grant for transmission in CG of that SCell. In this embodiment, if BFR MAC CE supports BFR information for multiple serving cells, all serving cells for which BFR information is included in generated MAC CE belong to same CG.

In another embodiment of this disclosure, UE transmits the BFR MAC CE for SCell of a CG to SpCell of any CG. In other words, UE transmits BFR MAC CE for SCell of a CG in the UL grant for transmission on SpCell of any CG. If the BFR MAC CE for SCell belonging to MCG is transmitted in UL grant for SCG, secondary gNB upon receiving this MAC CE, transmits to master gNB (over Xn interface) the contents of BFR MAC CE related to SCell of MCG. If the BFR MAC CE for SCell belonging to SCG is transmitted in UL grant for MCG, master gNB upon receiving this MAC CE, transmits to secondary gNB (over Xn interface) the contents of BFR MAC CE related to SCell of SCG. The advantage is that BFR information for SCell can be transmitted quickly. In this embodiment, if BFR MAC CE supports BFR information for multiple serving cells, serving cells for which BFR information is included in generated MAC CE can belong to different CG.

In another embodiment of this disclosure, UE transmits the BFR MAC CE for SCell of a CG to any serving cell (can be SpCell or SCell) of any CG. In other words, UE transmits BFR MAC CE for SCell of a CG in the UL grant for transmission on any serving cell of any CG. If the BFR MAC CE for SCell belonging to MCG is transmitted in UL grant for SCG, secondary gNB upon receiving this MAC CE, transmits to master gNB (over Xn interface) the contents of BFR MAC CE related to SCell of MCG. If the BFR MAC CE for SCell belonging to SCG is transmitted in UL grant for MCG, master gNB upon receiving this MAC CE, transmits to secondary gNB (over Xn interface) the contents of BFR MAC CE related to SCell of SCG. The advantage is that BFR information for SCell can be transmitted quickly. In this embodiment, if BFR MAC CE supports BFR information for multiple serving cells, serving cells for which BFR information is included in generated MAC CE can belong to different CG.

BFR MAC CE Prioritization:

Upon receiving the UL grant, MAC entity generates the MAC PDU by multiplexing MAC CEs/common control channel (CCCH)/dedicated control channel (DCCH)/dedicated traffic channel (DTCH) service data units (SDUs) according to logical channel prioritization. In the current system, logical channels are prioritized in accordance with the following order (highest priority listed first): cell radio network temporary identifier (C-RNTI) MAC CE or data from UL-CCCH; Configured Grant Confirmation MAC CE; MAC CE for buffer status report (BSR), with exception of BSR included for padding; Single Entry power headroom report (PHR) MAC CE or Multiple Entry PHR MAC CE; data from any Logical Channel, except data from UL-CCCH; MAC CE for Recommended bit rate query; and MAC CE for BSR included for padding.

The issue is what should be priority of BFR MAC CE compared to other MAC CEs/CCCH/DCCH/DTCH SDUs.

In one embodiment of this disclosure, MAC CE for BFR should have higher priority than MAC CE for BSR, Single Entry PHR MAC CE or Multiple Entry PHR MAC CE, data from any Logical Channel, except data from UL-CCCH, MAC CE for Recommended bit rate query and MAC CE for BSR included for padding. MAC CE for BFR should have lower priority than C-RNTI MAC CE or data from UL-CCCH and Configured Grant Confirmation MAC CE. The priority of MAC CE for BFR can be equal to priority of Configured Grant Confirmation MAC CE. Logical channels shall be prioritized in accordance with the following order (highest priority listed first): C-RNTI MAC CE or data from UL-CCCH; Configured Grant Confirmation MAC CE, MAC CE for BFR; MAC CE for BSR, with exception of BSR included for padding; Single Entry PHR MAC CE or Multiple Entry PHR MAC CE; data from any Logical Channel, except data from UL-CCCH; MAC CE for Recommended bit rate query; and MAC CE for BSR included for padding.

In another embodiment of this disclosure, MAC CE for BFR should have higher priority than Single Entry PHR MAC CE or Multiple Entry PHR MAC CE, data from any Logical Channel, except data from UL-CCCH, MAC CE for Recommended bit rate query and MAC CE for BSR included for padding. MAC CE for BFR should have lower priority than C-RNTI MAC CE or data from UL-CCCH, Configured Grant Confirmation MAC CE and MAC CE for BSR. Logical channels shall be prioritized in accordance with the following order (highest priority listed first): C-RNTI MAC CE or data from UL-CCCH; Configured Grant Confirmation MAC CE; MAC CE for BSR, with exception of BSR included for padding; MAC CE for BFR; Single Entry PHR MAC CE or Multiple Entry PHR MAC CE; data from any Logical Channel, except data from UL-CCCH; MAC CE for Recommended bit rate query; and MAC CE for BSR included for padding.

In another embodiment of this disclosure, we propose that MAC CE for BFR should have higher priority than data from any Logical Channel, except data from UL-CCCH, MAC CE for Recommended bit rate query and MAC CE for BSR included for padding. MAC CE for BFR should have lower priority than C-RNTI MAC CE or data from UL-CCCH, Configured Grant Confirmation MAC CE MAC CE for BSR and Single Entry PHR MAC CE or Multiple Entry PHR MAC CE. Logical channels shall be prioritized in accordance with the following order (highest priority listed first): C-RNTI MAC CE or data from UL-CCCH; Configured Grant Confirmation MAC CE; MAC CE for BSR, with exception of BSR included for padding; Single Entry PHR MAC CE or Multiple Entry PHR MAC CE; MAC CE for BFR; data from any Logical Channel, except data from UL-CCCH; MAC CE for Recommended bit rate query; and MAC CE for BSR included for padding.

Figure 26:
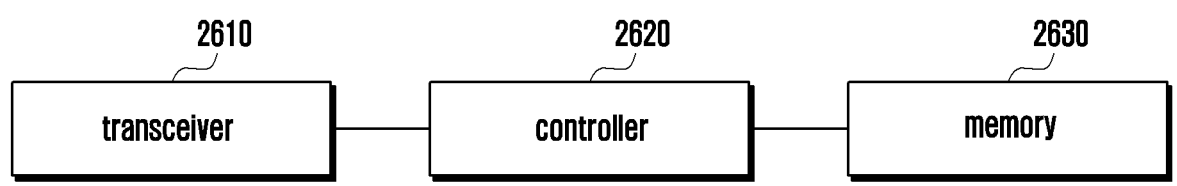
FIG. 26 is a block diagram of a terminal according to an embodiment of the disclosure.

FIG. 26 is a block diagram of a terminal according to an embodiment of the disclosure.

Referring to FIG. 26, a terminal includes a transceiver 2610, a controller 2620 and a memory 2630. The controller 2620 may refer to a circuitry, an ASIC, an FPGA, or at least one processor. The transceiver 2610, the controller 2620 and the memory 2630 are configured to perform the operations of the UE illustrated in the figures, e.g., FIGS. 2, 7, 11, 14 and 18, or as otherwise described above. Although the transceiver 2610, the controller 2620 and the memory 2630 are shown as separate entities, they may be integrated onto a single chip. The transceiver 2610, the controller 2620 and the memory 2630 may also be electrically connected to or coupled with each other.

The transceiver 2610 may transmit and receive signals to and from other network entities, e.g., a base station.

The controller 2620 may control the UE to perform functions according to the embodiments described above. For example, the controller 2620 is configured to control the transceiver 2610 to receive information for SCell BFR from a base station. The information for SCell BFR includes at least one of: a list of candidate beam RSs which is signaled per BWP of SCell, a candidate beam selection threshold which is signaled per BWP, or SR information which is signaled per cell group. The candidate beam RSs can be at least one of CSI-RS or SSB. All candidate beam RS(s) included in the list can be of same type, i.e., SSB or CSI-RS. Alternately, some candidate beam RS(s) included in the list are of type SSB and some candidate beam RS(s) included in the list are of type CSI-RS. An SR identifier is signaled which identifies the SR configuration to be used for BFR on SCell. If number of consecutive detected beam failure instances within a defined time duration (beamFailureDetectionTimer) exceeds a configured maximum number (beamFailureInstanceMaxCount), the controller 2620 is configured to control the transceiver 2610 to transmit an SR for BFR of SCell. The controller 2620 is configured to generate a BFR MAC CE including a candidate beam availability indication. This field indicates whether candidate SSB/CSI-RS above the configured threshold is available or not. The candidate SSB ID/CSI-RS ID is included only if there is at least one candidate SSB/CSI-RS above threshold is available. UE sets this field to '1' if candidate SSB/CSI-RS above the configured threshold is available. Otherwise, it sets this field to '0'. MAC CE for BFR has higher priority than MAC CE for BSR, Single Entry PHR MAC CE or Multiple Entry PHR MAC CE, data from any Logical Channel, except data from UL-CCCH, MAC CE for Recommended bit rate query and MAC CE for BSR included for padding.

In an embodiment, the operations of the terminal may be implemented using the memory 2630 storing corresponding program codes. Specifically, the terminal may be equipped with the memory 2630 to store program codes implementing desired operations. To perform the desired operations, the controller 2620 may read and execute the program codes stored in the memory 2630 by using a processor or a central processing unit (CPU).

Figure 27:
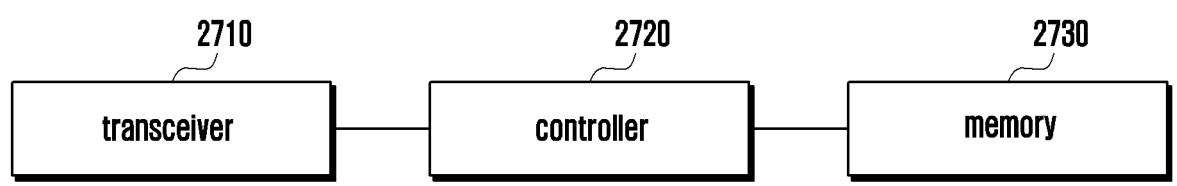
FIG. 27 is a block diagram of a base station according to an embodiment of the disclosure.

FIG. 27 is a block diagram of a base station according to an embodiment of the disclosure.

Referring to FIG. 27, a base station includes a transceiver 2710, a controller 2720 and a memory 2730. The controller 2720 may refer to a circuitry, an ASIC, an FPGA, or at least one processor. The transceiver 2710, the controller 2720 and the memory 2730 are configured to perform the operations of the gNB illustrated in the figures, e.g., FIGS. 3, 4, 5, 8, 9, 12, 15 and 19, or as otherwise described above. Although the transceiver 2710, the controller 2720 and the memory 2730 are shown as separate entities, they may be integrated onto a single chip. The transceiver 2710, the controller 2720 and the memory 2730 may also be electrically connected to or coupled with each other.

The transceiver 2710 may transmit and receive signals to and from other network entities, e.g., a terminal.

The controller 2720 may control the gNB to perform functions according to the embodiments of the disclosure. For example, the controller 2720 is configured to the transceiver 2710 to signal information for SCell BFR to a terminal, and receive an SR for the SCell BFR from the terminal. The controller 2720 is configured to control the transceiver 2710 to transmit a UL grant corresponding to the SR to the terminal, and receive a BFR MAC CE from the terminal.

In an embodiment, the operations of the base station may be implemented using the memory 2730 storing corresponding program codes. Specifically, the base station may be equipped with the memory 2730 to store program codes implementing desired operations. To perform the desired operations, the controller 2720 may read and execute the program codes stored in the memory 2730 by using a processor or a CPU.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   receiving, from a base station, information for beam failure recovery (BFR) on a secondary cell (SCell) including a list of reference signals identifying candidate beams for the BFR on the SCell and a reference signal received power (RSRP) threshold for determining a candidate beam;
   receiving, from the base station, a message comprising one or more scheduling request configurations, wherein each scheduling request configuration of the one or more scheduling request configurations comprises an identifier to indicate the respective scheduling request configuration of the one or more scheduling request configurations, and wherein the message further comprises an identifier indicating a scheduling request configuration for the BFR on the SCell from the one or more scheduling request configurations;
   in case that beam failure on the SCell is detected, transmitting, to the base station, a scheduling request for the BFR on the SCell based on the scheduling request configuration for the BFR on the SCell;
   receiving, from the base station, an uplink grant corresponding to the scheduling request;
   generating a BFR media access control (MAC) control element (CE) including a candidate beam availability indication, the candidate beam availability indication indicating whether at least one of the reference signals in the list with RSRP above the RSRP threshold is available; and
   transmitting, to the base station, the generated BFR MAC CE,
   wherein logical channels are prioritized in accordance with following order of cell radio network temporary identifier (C-RNTI) MAC CE or data from uplink (UL)-common control channel (CCCH), the BFR MAC CE, a MAC CE for a buffer state report (BSR) with exception of a BSR included for padding, a single entry power headroom report (PHR) MAC CE or multiple entry PHR MAC CE, data from any logical channel except data from UL-CCCH, a MAC CE for recommended bit rate query, and a MAC CE for BSR included for padding, and
   wherein the BFR MAC CE and configured grant confirmation MAC CE have a same priority.

2. The method of claim 1, wherein the transmitting the scheduling request for the BFR further comprises:
   detecting the beam failure on the SCell based on whether a number of beam failure instances within a preconfigured time duration exceeds a preconfigured number.

3. The method of claim 1, wherein the reference signals include at least one of a synchronization signal block (SSB) or a channel state information reference signal.

4. The method of claim 1, wherein the list of reference signals and the RSRP threshold are configured per a bandwidth part in the SCell, and the scheduling request configuration for the BFR on the SCell is configured per a cell group to which the SCell belongs.

5. A method performed by a base station in a wireless communication system, the method comprising:
   transmitting, to a terminal, information for beam failure recovery (BFR) on a secondary cell (SCell) including a list of reference signals identifying candidate beams for the BFR on the SCell and a reference signal received power (RSRP) threshold for determining a candidate beam;
   transmitting, to the terminal, a message comprising one or more scheduling request configurations, wherein each scheduling request configuration of the one or more scheduling request configurations comprises an identifier to indicate the respective scheduling request configuration of the one or more scheduling request configurations, and wherein the message comprises an identifier indicating a scheduling request configuration for the BFR on the SCell from the one or more scheduling request configurations;
   receiving, from the terminal, a scheduling request for the BFR on the SCell based on the scheduling request configuration for the BFR on the SCell;
   transmitting, to the terminal, an uplink grant corresponding to the scheduling request; and receiving, from the terminal, a BFR media access control (MAC) control element (CE) including a candidate beam availability indication, the candidate beam availability indication indicating whether at least one of the reference signals in the list with RSRP above the RSRP threshold is available, wherein logical channels are prioritized in accordance with following order of cell radio network temporary identifier (C-RNTI) MAC CE or data from uplink (UL)-common control channel (CCCH), the BFR MAC CE, a MAC CE for a buffer state report (BSR) with exception of a BSR included for padding, a single entry power headroom report (PHR) MAC CE or multiple entry PHR MAC CE, data from any logical channel except data from UL-CCCH, a MAC CE for recommended bit rate query, and a MAC CE for BSR included for padding, and wherein the BFR MAC CE and configured grant confirmation MAC CE have a same priority.

6. The method of claim 5, wherein the reference signals include at least one of a synchronization signal block (SSB) or a channel state information reference signal.

7. The method of claim 5, wherein the list of reference signals and the RSRP threshold are configured per a bandwidth part in the SCell, and the scheduling request configuration for the BFR on the SCell is configured per a cell group to which the SCell belongs.

8. A terminal in a wireless communication system, the terminal comprising:
a transceiver; and
at least one processor operatively coupled with the transceiver and configured to:
receive, from a base station, information for beam failure recovery (BFR) on a secondary cell (SCell) including a list of reference signals identifying candidate beams for the BFR on the SCell and a reference signal received power (RSRP) threshold for determining a candidate beam,
receive, from the base station, a message comprising one or more scheduling request configurations, wherein each scheduling request configuration of the one or more scheduling request configurations comprises an identifier to indicate the respective scheduling request configuration of the one or more scheduling request configurations, and wherein the message further comprises an identifier indicating a scheduling request configuration for the BFR on the SCell from the one or more scheduling request configurations,
in case that beam failure on the SCell is detected, transmit, to the base station, a scheduling request for the BFR on the SCell based on the scheduling request configuration for the BFR on the SCell,
receive, from the base station, an uplink grant corresponding to the scheduling request,
generate a BFR media access control (MAC) control element (CE) including a candidate beam availability indication, the candidate beam availability indication indicating whether at least one of the reference signals in the list with RSRP above the RSRP threshold is available, and
transmit, to the base station, the generated BFR MAC CE, wherein logical channels are prioritized in accordance with following order of cell radio network temporary identifier (C-RNTI) MAC CE or data from uplink (UL)-common control channel (CCCH), the BFR MAC CE, a MAC CE for a buffer state report (BSR) with exception of a BSR included for padding, a single entry power headroom report (PHR) MAC CE or multiple entry PHR MAC CE, data from any logical channel except data from UL-CCCH, a MAC CE for recommended bit rate query, and a MAC CE for BSR included for padding, and wherein the BFR MAC CE and configured grant confirmation MAC CE have a same priority.

9. The terminal of claim 8, wherein the at least one processor is further configured to:
detect the beam failure on the SCell based on whether a number of beam failure instances within a preconfigured time duration exceeds a preconfigured number.

10. The terminal of claim 8, wherein the reference signals include at least one of a synchronization signal block (SSB) or a channel state information reference signal.

11. The terminal of claim 8, wherein the list of reference signals and the RSRP threshold are configured per a bandwidth part in the SCell, and the scheduling request configuration for the BFR on the SCell is configured per a cell group to which the SCell belongs.

12. A base station in a wireless communication system, the base station comprising:
a transceiver; and
at least one processor operatively coupled with the transceiver and configured to:
transmit, to a terminal, information for beam failure recovery (BFR) on a secondary cell (SCell) including a list of reference signals identifying candidate beams for the BFR on the SCell and a reference signal received power (RSRP) threshold for determining a candidate beam,
transmit, to the terminal, a message comprising one or more scheduling request configurations, wherein each scheduling request configuration of the one or more scheduling request configurations comprises an identifier to indicate the respective scheduling request configuration of the one or more scheduling request configurations, and wherein the message further comprises an identifier indicating a scheduling request configuration for the BFR on the SCell from the one or more scheduling request configurations,
receive, from the terminal, a scheduling request for the BFR on the SCell based on the scheduling request configuration for the BFR on the SCell,
transmit, to the terminal, an uplink grant corresponding to the scheduling request, and
receive, from the terminal, a BFR media access control (MAC) control element (CE) including a candidate beam availability indication, the candidate beam availability indication indicating whether at least one of the reference signals in the list with RSRP above the RSRP threshold is available, wherein logical channels are prioritized in accordance with following order of cell radio network temporary identifier (C-RNTI) MAC CE or data from uplink (UL)-common control channel (CCCH), the BFR MAC CE, a MAC CE for a buffer state report (BSR) with exception of a BSR included for padding, a single entry power headroom report (PHR) MAC CE or multiple entry PHR MAC CE, data from any logical channel except data from UL-CCCH, a MAC CE for recommended bit rate query, and a MAC CE for BSR included for padding, and wherein the BFR MAC CE and configured grant confirmation MAC CE have a same priority.

13. The base station of claim 12, wherein reference signals include at least one of a synchronization signal block (SSB) or a channel state information reference signal.

14. The base station of claim 12, wherein the list of reference signals and the RSRP threshold are configured per a bandwidth part in the SCell, and the scheduling request configuration for the BFR on the SCell is configured per a cell group to which the SCell belongs.

* * * * *